(12) United States Patent
Hook et al.

(10) Patent No.: US 8,136,936 B2
(45) Date of Patent: Mar. 20, 2012

(54) APPARATUS AND METHODS FOR CONTROLLING APPLICATION OF A SUBSTANCE TO A SUBSTRATE

(75) Inventors: Kevin J. Hook, Grand Island, NY (US); Theodore F. Cyman, Jr., Grand Island, NY (US); Lawrence Pilon, Grand Island, NY (US); Jeffrey Zaloom, Getzville, NY (US)

(73) Assignee: Moore Wallace North America, Inc., Chicago, IL (US)

( * ) Notice: Subject to any disclaimer, the term of this patent is extended or adjusted under 35 U.S.C. 154(b) by 581 days.

(21) Appl. No.: 12/229,149

(22) Filed: Aug. 20, 2008

(65) Prior Publication Data

US 2009/0064886 A1    Mar. 12, 2009

Related U.S. Application Data

(60) Provisional application No. 60/965,361, filed on Aug. 20, 2007, provisional application No. 60/965,634, filed on Aug. 21, 2007, provisional application No. 60/965,753, filed on Aug. 22, 2007, provisional application No. 60/965,861, filed on Aug. 23, 2007, provisional application No. 60/965,744, filed on Aug. 22, 2007, provisional application No. 60/965,743, filed on Aug. 22, 2007.

(51) Int. Cl.
  *B41J 2/01* (2006.01)
(52) U.S. Cl. ........................ 347/103; 347/101
(58) Field of Classification Search .................. 347/103, 347/101, 102
See application file for complete search history.

(56) References Cited

U.S. PATENT DOCUMENTS

| 778,892 | A | 1/1905 | Read |
| 1,766,957 | A | 6/1930 | Smith |
| 2,129,071 | A | 9/1938 | Rowell |
| 2,200,363 | A | 5/1940 | Kreis |
| 2,203,849 | A | 6/1940 | Trist |
| 2,340,562 | A | 2/1944 | Rey |
| 2,350,382 | A | 6/1944 | Angel |
| 2,562,782 | A | 7/1951 | Frost |
| 2,722,175 | A | 11/1955 | Stitz |
| 2,763,204 | A | 9/1956 | Sims, Jr. |
| 3,060,848 | A | 10/1962 | Beutner |
| 3,113,511 | A | 12/1963 | Dalton |
| 3,113,512 | A | 12/1963 | Newman |

(Continued)

FOREIGN PATENT DOCUMENTS

CA    2 392 730    10/2003

(Continued)

OTHER PUBLICATIONS

International Search Report and Written Opinion in PCT/US2008/009911 dated Oct. 23, 2008.

(Continued)

*Primary Examiner* — Manish S Shah
(74) *Attorney, Agent, or Firm* — McCracken & Frank LLC

(57) ABSTRACT

Apparatus and methods for controlling application of a substance to a substrate involve the use of a functional agent that blocks the substance from or attracts the principal substance to the substrate. The apparatus and methods may utilize ink jet technology to apply the functional agent directly to the substrate or to an intermediate surface. The principal substance may be an ink, a dye, a marking substance other than an ink, or a carrier for any other type of substance.

25 Claims, 6 Drawing Sheets

U.S. PATENT DOCUMENTS

| | | |
|---|---|---|
| 3,220,345 A | 11/1965 | Kline et al. |
| 3,376,810 A | 4/1968 | Blake et al. |
| 3,390,631 A | 7/1968 | Koszul |
| 3,648,603 A | 3/1972 | Kaminstein |
| 3,741,118 A | 6/1973 | Carley |
| 3,790,703 A | 2/1974 | Carley |
| 3,800,699 A | 4/1974 | Carley |
| 3,986,452 A | 10/1976 | Dahlgren |
| 4,010,686 A | 3/1977 | Harris |
| 4,044,671 A | 8/1977 | Hou et al. |
| 4,069,759 A | 1/1978 | Endo et al. |
| 4,368,669 A | 1/1983 | Love, III |
| 4,718,340 A | 1/1988 | Love, III |
| 4,729,310 A | 3/1988 | Love, III |
| 4,808,443 A | 2/1989 | Minamoto et al. |
| 4,833,486 A | 5/1989 | Zerillo |
| 4,833,530 A * | 5/1989 | Kohashi ................ 347/103 |
| 5,106,414 A | 4/1992 | Kunichika et al. |
| 5,129,321 A | 7/1992 | Fadner |
| 5,188,033 A | 2/1993 | Fadner |
| 5,202,206 A | 4/1993 | Tam |
| 5,221,330 A | 6/1993 | Matsumoto et al. |
| 5,312,654 A | 5/1994 | Arimatsu et al. |
| 5,333,548 A | 8/1994 | Fadner |
| 5,389,958 A * | 2/1995 | Bui et al. ................ 347/103 |
| 5,462,591 A | 10/1995 | Karandikar et al. |
| 5,495,803 A | 3/1996 | Gerber et al. |
| 5,501,150 A | 3/1996 | Leenders et al. |
| 5,505,126 A | 4/1996 | Ohno et al. |
| 5,511,477 A | 4/1996 | Adler et al. |
| 5,552,817 A | 9/1996 | Kuehnle |
| 5,554,212 A | 9/1996 | Bui et al. |
| 5,560,608 A | 10/1996 | Silverschotz |
| 5,644,981 A | 7/1997 | Ohno et al. |
| 5,681,065 A | 10/1997 | Rua, Jr. et al. |
| 5,697,297 A | 12/1997 | Rasmussen |
| 5,738,013 A | 4/1998 | Kellett |
| 5,820,932 A | 10/1998 | Hallman et al. |
| 5,852,975 A | 12/1998 | Miyabe et al. |
| 5,906,156 A | 5/1999 | Shibuya et al. |
| 5,953,988 A | 9/1999 | Vinck |
| 5,966,154 A | 10/1999 | DeBoer |
| 5,969,740 A | 10/1999 | Maeda et al. |
| 6,006,666 A | 12/1999 | Gottling |
| 6,050,193 A | 4/2000 | DeBoer et al. |
| 6,079,331 A | 6/2000 | Koguchi et al. |
| 6,079,806 A | 6/2000 | Wen et al. |
| 6,082,263 A | 7/2000 | Koguchi et al. |
| 6,113,231 A | 9/2000 | Burr et al. |
| 6,120,665 A | 9/2000 | Chiang et al. |
| 6,125,750 A | 10/2000 | Achelpohl |
| 6,125,755 A | 10/2000 | Link et al. |
| 6,126,281 A | 10/2000 | Shimoda et al. |
| 6,131,514 A | 10/2000 | Simons |
| 6,152,037 A | 11/2000 | Ishii et al. |
| 6,164,757 A | 12/2000 | Wen et al. |
| 6,173,647 B1 | 1/2001 | Kakuta et al. |
| 6,196,129 B1 | 3/2001 | Kellett |
| 6,231,177 B1 | 5/2001 | Cherukuri et al. |
| 6,283,031 B1 | 9/2001 | Kakuta et al. |
| 6,283,589 B1 | 9/2001 | Gelbart |
| 6,295,928 B1 | 10/2001 | Heinzl et al. |
| 6,298,780 B1 | 10/2001 | Ben-Horin et al. |
| 6,315,916 B1 | 11/2001 | Deutsch et al. |
| 6,318,264 B1 | 11/2001 | D'Heureuse et al. |
| 6,341,559 B1 | 1/2002 | Riepenhoff et al. |
| 6,354,207 B1 | 3/2002 | Maekawa et al. |
| 6,393,980 B2 | 5/2002 | Simons |
| 6,402,317 B2 | 6/2002 | Yanagawa et al. |
| 6,416,175 B2 | 7/2002 | Furukawa et al. |
| 6,470,799 B2 | 10/2002 | Nakazawa et al. |
| 6,477,948 B1 | 11/2002 | Nissing et al. |
| 6,520,087 B2 | 2/2003 | Heinzl et al. |
| 6,526,886 B2 | 3/2003 | Loccufier et al. |
| 6,539,856 B2 | 4/2003 | Jones et al. |
| 6,543,360 B2 | 4/2003 | Sasaki et al. |
| 6,558,458 B1 | 5/2003 | Gloster |
| 6,566,039 B1 | 5/2003 | Teng |
| 6,585,367 B2 | 7/2003 | Gore |
| 6,595,631 B2 | 7/2003 | Tanikawa et al. |
| 6,634,295 B1 | 10/2003 | Newington et al. |
| 6,644,183 B2 | 11/2003 | Takasawa et al. |
| 6,652,631 B2 | 11/2003 | Itakura |
| 6,662,723 B2 | 12/2003 | Loccufier et al. |
| 6,679,170 B2 | 1/2004 | Mori |
| 6,699,640 B2 | 3/2004 | Veruschueren et al. |
| 6,736,500 B2 | 5/2004 | Takahashi et al. |
| 6,739,260 B2 | 5/2004 | Damme et al. |
| 6,745,693 B2 | 6/2004 | Teng |
| 6,758,140 B1 | 7/2004 | Szumia et al. |
| 6,772,687 B2 | 8/2004 | Damme et al. |
| 6,779,444 B2 | 8/2004 | Hauptmann et al. |
| 6,780,305 B2 | 8/2004 | Nishino et al. |
| 6,783,228 B2 | 8/2004 | Szumia et al. |
| 6,815,075 B2 | 11/2004 | Kasai et al. |
| 6,815,366 B2 | 11/2004 | Higuchi |
| 6,852,363 B2 | 2/2005 | Loccufier et al. |
| 6,862,992 B2 | 3/2005 | Nakazawa et al. |
| 6,906,019 B2 | 6/2005 | Nitzan et al. |
| 6,918,663 B2 | 7/2005 | Schaschek et al. |
| 6,935,735 B2 | 8/2005 | Tanikawa et al. |
| 6,983,693 B2 | 1/2006 | Simons |
| 7,070,269 B2 | 7/2006 | Tanikawa et al. |
| 7,191,703 B2 | 3/2007 | Dilling |
| 7,191,705 B2 | 3/2007 | Berg et al. |
| 7,240,998 B2 | 7/2007 | Murakami et al. |
| 7,281,790 B2 | 10/2007 | Mouri et al. |
| 7,311,396 B2 | 12/2007 | Kwon et al. |
| 7,523,704 B2 | 4/2009 | Domotor |
| 7,691,280 B2 | 4/2010 | Waldrop et al. |
| 2002/0017209 A1 | 2/2002 | Gutfleisch et al. |
| 2002/0038611 A1 | 4/2002 | Naniwa et al. |
| 2002/0043171 A1 | 4/2002 | Loccufier et al. |
| 2002/0056388 A1 | 5/2002 | Makino |
| 2002/0104455 A1 | 8/2002 | Deutsch et al. |
| 2002/0139268 A1 | 10/2002 | Emery et al. |
| 2003/0089261 A1 | 5/2003 | Landsman |
| 2003/0159607 A1 | 8/2003 | Nitzan et al. |
| 2003/0190557 A1 | 10/2003 | Lee et al. |
| 2004/0053011 A1 | 3/2004 | Behm et al. |
| 2004/0090508 A1 | 5/2004 | Chowdry et al. |
| 2004/0090516 A1 | 5/2004 | Gruetzmacher et al. |
| 2004/0103801 A1 | 6/2004 | Miller et al. |
| 2004/0103803 A1 | 6/2004 | Price et al. |
| 2004/0129158 A1 | 7/2004 | Figov et al. |
| 2004/0154489 A1 | 8/2004 | Deutsch et al. |
| 2004/0187720 A1 | 9/2004 | Naniwa et al. |
| 2005/0028696 A1 | 2/2005 | Price et al. |
| 2005/0056169 A1 | 3/2005 | Hashimoto et al. |
| 2005/0115429 A1 | 6/2005 | Link |
| 2005/0181187 A1 | 8/2005 | Vosseler et al. |
| 2005/0204945 A1 | 9/2005 | Sonokawa |
| 2005/0211130 A1 | 9/2005 | Watanabe |
| 2005/0223927 A1 | 10/2005 | Wiedemer |
| 2006/0040210 A1 | 2/2006 | Eck et al. |
| 2006/0077243 A1 | 4/2006 | Edwards |
| 2006/0102025 A1 | 5/2006 | Wittemann |
| 2006/0201361 A1 | 9/2006 | Wiedemer |
| 2006/0216525 A1 | 9/2006 | Huybrechts et al. |
| 2006/0284951 A1 | 12/2006 | Ikeda et al. |
| 2007/0062389 A1 | 3/2007 | Link |
| 2007/0068404 A1 | 3/2007 | Hirahara et al. |
| 2007/0137509 A1 | 6/2007 | Fork |
| 2007/0164559 A1 | 7/2007 | Kozdras |
| 2007/0199457 A1 | 8/2007 | Cyman et al. |
| 2007/0199458 A1 | 8/2007 | Cyman et al. |
| 2007/0199459 A1 | 8/2007 | Cyman et al. |
| 2007/0199460 A1 | 8/2007 | Cyman et al. |
| 2007/0199461 A1 | 8/2007 | Cyman et al. |
| 2007/0199462 A1 | 8/2007 | Cyman et al. |
| 2007/0200794 A1 | 8/2007 | Mueller et al. |
| 2007/0204755 A1 | 9/2007 | Moreau |
| 2008/0271627 A1 | 11/2008 | Teng |
| 2009/0056577 A1 | 3/2009 | Hook et al. |
| 2009/0056578 A1 | 3/2009 | DeJoseph et al. |
| 2009/0064884 A1 | 3/2009 | Hook et al. |
| 2009/0213201 A1 | 8/2009 | Numata et al. |

FOREIGN PATENT DOCUMENTS

| | | |
|---|---|---|
| DE | 4327212 | 2/1995 |
| DE | 10245066 | 4/2003 |
| EP | 101 266 | 2/1984 |
| EP | 0126479 | 11/1984 |
| EP | 0588399 | 3/1994 |
| EP | 0590164 | 4/1994 |
| EP | 601 531 | 6/1994 |
| EP | 0601531 | 6/1994 |
| EP | 0646458 | 4/1995 |
| EP | 882 584 | 12/1998 |
| EP | 0883026 | 12/1998 |
| EP | 911 154 | 4/1999 |
| EP | 911 155 | 4/1999 |
| EP | 0936064 | 8/1999 |
| EP | 965 444 | 12/1999 |
| EP | 1 118 470 | 7/2001 |
| EP | 1 118 471 | 7/2001 |
| EP | 1 118 472 | 7/2001 |
| EP | 1170122 | 1/2002 |
| EP | 1177514 | 2/2002 |
| EP | 1177914 | 2/2002 |
| EP | 1 426 193 | 6/2004 |
| EP | 1 522 404 | 4/2005 |
| EP | 1 547 793 | 6/2005 |
| JP | 53-15905 | 2/1978 |
| JP | 56-105960 | 8/1981 |
| JP | 56-113456 | 9/1981 |
| JP | 58-217567 | 12/1983 |
| JP | 62-025081 | 2/1987 |
| JP | 63-109052 | 5/1988 |
| JP | 02-269094 | 11/1990 |
| JP | 4-69244 | 3/1992 |
| JP | 4-97848 | 3/1992 |
| JP | 6-225081 | 8/1994 |
| JP | 09-267549 | 10/1997 |
| JP | 10-235989 | 9/1998 |
| JP | 10-286939 | 10/1998 |
| JP | 2946201 | 10/1998 |
| JP | 11-320865 | 11/1999 |
| JP | 2001-225437 | 8/2001 |
| JP | 2002-127354 | 5/2002 |
| JP | 2002-326455 | 11/2002 |
| JP | 2002-361833 | 12/2002 |
| JP | 2004-299167 | 10/2004 |
| JP | 2005-059458 | 3/2005 |
| JP | 2005-074693 | 3/2005 |
| JP | 3756943 | 3/2005 |
| JP | 2005-313490 | 11/2005 |
| WO | WO 94/11191 | 5/1994 |
| WO | WO 01-34394 | 5/2001 |
| WO | WO 01-49506 | 7/2001 |
| WO | WO 01-54915 | 8/2001 |
| WO | WO 2004/039586 | 5/2004 |
| WO | WO 2007-071551 | 6/2007 |

OTHER PUBLICATIONS

International Search Report and Written Opinion in PCT/US2008/009901 dated Nov. 4, 2008.
U.S. Appl. No. 60/775,511, Inventors Cyman, Jr. et al., filed Feb. 21, 2006.
U.S. Appl. No. 60/819,301, Inventors Cyman, Jr. et al., filed Jul. 7, 2006.
Industry News dated Jun. 16, 2008, http://www.dealercommunicator.com/indnew.htm. (2 pages).
News release Hitachi Koki Imaging Solutions, Inc. Becomes Hitachi Printing Solutions America, Inc., for Release Oct. 1, 2002, 2 pages.
Search Report in EP 08 00 6593 dated Jan. 12, 2009.
Search Report in EP 08 00 6594 dated Jan. 12, 2009.
International Preliminary Report on Patentability and Written Opinion for PCT/US2008/009893, dated Mar. 4, 2010.
U.S. Appl. No. 61/278,915, Inventors DeJoseph, et al., filed Oct. 14, 2009.
International Preliminary Report on Patentability and Written Opinion for PCT/US2008/009910 dated Mar. 4, 2010.
International Preliminary Report on Patentability and Written Opinion for PCT/US2008/009901 dated Mar. 4, 2010.
U.S. Appl. No. 61/254,101, Inventors DeJoseph et al., filed Oct. 22, 2009.
International Preliminary Report on Patentability and Written Opinion for PCT/US2008/009911 dated Mar. 4, 2010.
International Search Report and Written Opinion, International Application No. PCT/US2007/004437 dated Sep. 3, 2007.
International Search Report and Written Opinion, International Application No. PCT/US2007/004440 dated Aug. 28, 2007.
International Search Report and Written Opinion, International Application No. PCT/US2007/004438 dated Aug. 28, 2007.
International Search Report and Written Opinion, International Application No. PCT/US2007/004441 dated Aug. 28, 2007.
International Search Report and Written Opinion, International Application No. PCT/US2007/004442 dated Aug. 28, 2007.
International Search Report and Written Opinion, International Application No. PCT/US2007/004444 dated Aug. 28, 2007.
International Preliminary Report on Patentability dated Sep. 4, 2008, International Application No. PCT/US2007/004437 International filing date Feb. 21, 2007.
International Preliminary Report on Patentability dated Sep. 4, 2008, International Application No. PCT/US2007/004438 International filing date Feb. 21, 2007.
International Preliminary Report on Patentability dated Sep. 4, 2008, International Application No. PCT/US2007/004440 International filing date Feb. 21, 2007.
International Preliminary Report on Patentability dated Sep. 4, 2008, International Application No. PCT/US2007/004441 International filing date Feb. 21, 2007.
International Preliminary Report on Patentability dated Sep. 4, 2008, International Application No. PCT/US2007/004442 International filing date Feb. 21, 2007.
International Preliminary Report on Patentability dated Sep. 4, 2008, International Application No. PCT/US2007/004444 International filing date Feb. 21, 2007.
International Search Report and Written Opinion for PCT/US2008/009893 dated Jan. 23, 2009.
Response letter to EPO for Appl. No. 08006594.9, dated Nov. 26, 2009, and attached amendments and EP search report 08006594 Jan. 12, 2009.
International Search Report and Written Opinion for PCT/US2008/009910 dated Jan. 20, 2009.
"Amendment of the Claims" for PCT/US2008/009893 dated Mar. 20, 2009 (2 pages).
"Amendment of the Claims" for PCT/US2008/009910 dated Mar. 19, 2009 (3 pages).
EPO Office Action dated Oct. 1, 2010, EP Application No. 08-006-593.1, Applicant Moore Wallace North America, Inc.
EPO Office Action dated Jul. 28, 2010, EP Application No. 07-751-214.3, Applicant Moore Wallace North America, Inc.
Letter to EPO dated Aug. 12, 2010 with attachment, EP Application No. 08-006-593.1, Applicant Moore Wallace North America, Inc.
Letter to EPO dated Jul. 19, 2010 with attachment, EP Application No. 08828001.1, Applicant Moore Wallace North America, Inc.
EPO Office Action dated Jul. 28, 2010, EP Application No. 08-006-593.1, Applicant Moore Wallace North America, Inc.
Letter to EPO dated Jul. 19, 2010 with attachment, EP Application No. 08795460.8, Applicant Moore Wallace North America, Inc.
BASF Corporation 1999, Table of Contents, (37 pages).
BASF Corporation 2002 Technical Bulletin, "Pluronic® F127 Block Copolymer Surfactant", (1 page).
Response letter to EPO for Appl. No. 08-006-593.1-1251, dated Feb. 8, 2010, and attached amendments.
Lamont Wood, 3-D Home Printers Could Change Economy Oct. 11, 2007, URL: http://www/msnbc.msn.com/id/21252137/, (2 pages).
W. Shen et al., "A New Understanding on the Mechanism of Fountain Solution in the Prevention of Ink Transfer to the Non-image Area in Conventional Offset Lithography", J. Adhesion Sci. Technol., vol. 18, No. 15-16, pp. 1861-1887, (2004), (27 pages).
Air Products, Surfynol® 400 Series Surfactants, (3 pages).
"Amine Ethoxylates," (Jun. 26, 2008), URL: http://www.huntsman.com/performance_products/Index.cfm?PageID=5723&PrintPage=1&Showtitle=1, (1 page).

"Effect of Polyether Monoamine Structure on Pigment Dispersant Properties," (Feb. 2, 2009), Paint & Coatings Industry, (Mar. 1, 2006), URL: http://www.accessmylibrary.com/comsite5/bin/aml_landing_tt.pl?purchase_type=ITM & item..., (5 pages).

R. Steitz et al., "Experimental Report: Does the Chemical Nature of the Substrate Trigger Net Adsorption of Pluronic F127?", BENSC, (Jan. 15, 2003), (1 page).

BASF, Key Features & Benefits, Joncryl® 50, (2 pages); Joncryl® 52 (2 pages); Joncryl® 60 (2 pages); Joncryl® 61 (2 pages); Joncryl® 678 (3 pages); Joncryl® 682 (3 pages), (Mar. 23, 2007).

Polyethylenimines (General Information), (3 pages).

Nissan Chemical—Colloidal Silica, "Snowtex®", URL: http://www.nissanchem-usa.com/snowtex.php, (Jun. 26, 2008), (8 pages).

Huntsman Corporation 2005 Technical Bulletin, "Surfonic® T-2 Surfactant", (2 pages).

Huntsman Corporation 2007 Technical Bulletin, "The Use of SURFONAMINE® Amines in Ink and Pigment Applications", (5 pages).

H. Kipphan: "Handbook of Print Media" 2001, Springer, Berlin, XP002446641, p. 52-55.

Katherine O'Brien, "CTP in Small Packages," American Printer, Sep. 1, 1998, 4 pages.

Gloster et al., Abstract of "Direct Computer to Plate Printing," Society for Imaging Science and Technology, Oct. 2001, 1 page.

Nobuhiro et al., Abstract of "Application of Solid Ink Jet Technology to a Direct Plate Maker," Science Links Japan, 1999, 1 page.

EPO Office Action for Appl. No. 077-751-211.9-1251, dated Sep. 22, 2009, and attached Jul. 1, 2009 letter to EPO and amendments.

Response letter to EPO for Appl. No. 077-751-211.9-1251, dated Jan. 29, 2010, and attached amendments.

EPO Office Action for Appl. No. 077-751-214.3-1251, dated Aug. 3, 2009, and attached Jul. 1, 2009 letter to EPO and amendments.

Response letter to EPO for Appl. No. 077-751-214.3-1251, dated Oct. 21, 2009.

EPO Office Action for Appl. No. 077-751-214.3-1251, dated Dec. 10, 2009, and attached Jul. 1, 2009 letter to EPO and amendments.

Response letter to EPO for Appl. No. 077-751-214.3-1251, dated Mar. 31, 2010, and attached amendments.

EPO Office Action for Appl. No. 08-006-593.1-1251, dated Oct. 8, 2009.

3rd Supplemental Information Disclosure Statement & Interview Summary dated, Apr. 28, 2010 for U.S. Appl. No. 11/709,396.

Letter to EPO dated Dec. 7, 2010, with attachments, EP Application No. 08-006-593.1, Applicant Moore Wallace North America, Inc.

Letter to EPO dated Nov. 30, 2010, with attachments, EP Application No. 07-751-214.3, Applicant Moore Wallace North America, Inc.

Letter from Mr. Qi Xue regarding Second Office Action from Chinese Patent Office dated Nov. 29, 2010, Chinese Patent Application No. 200780006170.9, Applicant Moore Wallace North America, Inc.

Second Office Action dated Nov. 3, 2010, with English translation attached, Chinese Patent Application No. 200780006170.9, Applicant Moore Wallace North America, Inc.

Letter to Mr. Qi Xue dated Jan. 4, 2011, Chinese Patent Application No. 200780006170.9, Applicant Moore Wallace North America, Inc.

Letter from Mr. Qi Xue dated Jan. 7, 2011, Chinese Patent Application No. 200780006170.9, Applicant Moore Wallace North America, Inc.

Letter to Mr. Qi Xue dated Jan. 12, 2011 regarding Jan. 7, 2011 communication, Chinese Patent Application No. 200780006170.9, Applicant Moore Wallace North America, Inc.

Letter from Mr. Qi Xue dated Jan. 13, 2011, Chinese Patent Application No. 200780006170.9, Applicant Moore Wallace North America, Inc.

Letter to Mr. Qi Xue dated Jan. 12, 2011 regarding Jan. 12, 2011 communication, Chinese Patent Application No. 200780006170.9, Applicant Moore Wallace North America, Inc.

Letter from Mr. Qi Xue dated Jan. 18, 2011 regarding Second Office Action Response, Chinese Patent Application No. 200780006170.9, Applicant Moore Wallace North America, Inc.

Second Office Action Response dated Jan. 18, 2011, with English translation attached, Chinese Patent Application No. 200780006170.9, Applicant Moore Wallace North America, Inc.

Email to Mr. Qi Xue dated Mar. 9, 2011, with substitute Response to Second Office Action attached, Chinese Patent Application No. 200780006170.9, Applicant Moore Wallace North America, Inc.

www.flickr.com, "MacWorld Magazine: Cover Art Woes", website, http://www.flickr.com/photos/66071596@N00/3964123486/ (printed on Mar. 8, 2011).

www.livedocs.adobe.com, "Fill a selection or layer with a color", website, http://livedocs.adobe.com/en_US/Photoshop/10.0/help.html?content=WSfd1234e1c4b69f30ea53e41001031ab64-77d4.html (printed on Mar. 8, 2011).

www.magazinepublisher.com, "Mailing Magazines", website, http://www.magazinepublisher.com/mailing.html (printed on Mar. 8, 2011).

www.printindustry.com, "Magazine Cover Wraps", website, http://www.printindustry.com/Newsletters/Newsletter---67.aspx (printed on Mar. 8, 2011).

www.mdprint.com, "M&D Printing Periodical Co-mailing Template Inkjet Knockout Version", available at http://www.mdprint.com/knockout%20template.pdf, (printed on Mar. 8, 2011).

www.riponprinters.com, "Designing Your Mailpiece for Inkjet Addressing", available at http://www.riponprinters.com/tech---library/pdf/M7_TLines_Design_for_Inkjet.pdf (printed on Mar. 8, 2011).

www.malanenewman.com, "Graphic Design Terminology", website, available at http://www.malanenewman.com/graphic_design_terminology.html (printed on Mar. 8, 2011).

International Search Report and Written Opinion in PCT/US2010/053830 dated Dec. 27, 2010.

EPO Communication under Rule 71(3) EPC dated Jan. 10, 2011, with attached examiner's amendments, European Patent Appl. No. 07751211.9, Applicant Moore Wallace North America, Inc.

Second email to Mr. Qi Xue dated Mar. 9, 2011, with revised substitute Response to Second Office Action attached, Chinese Patent Application No. 200780006170.9, Applicant Moore Wallace North America, Inc.

European Patent Office Search Report & Written Opinion, EP 11 17 1598 dated Sep. 14, 2011.

Second Office Action dated Apr. 6, 2011, with English translation attached, Chinese Patent Application No. 200780006171.3, Applicant Moore Wallace North America, Inc.

Letter to Mr. Qi Xue dated May 12, 2011, with claim amendments attached, Chinese Patent Application No. 200780006171.3, Applicant Moore Wallace North America, Inc.

Letter from Mr. Qi Xue dated Jun. 8, 2011, Chinese Patent Application No. 200780006171.3, Applicant Moore Wallace North America, Inc.

* cited by examiner

APPARATUS AND METHODS FOR CONTROLLING APPLICATION OF A SUBSTANCE TO A SUBSTRATE

CROSS-REFERENCE TO RELATED APPLICATIONS

The present application claims the benefit of provisional U.S. Patent Application Nos. 60/965,361, filed Aug. 20, 2007; 60/965,634, filed Aug. 21, 2007; 60/965,753, filed Aug. 22, 2007; 60/965,861, filed Aug. 23, 2007; 60/965,744, filed Aug. 22, 2007; and 60/965,743, filed Aug. 22, 2007. All of the above listed applications are hereby incorporated by reference herein in their entireties.

BACKGROUND

Lithographic and gravure printing techniques have been refined and improved for many years. The basic principle of lithography includes the step of transferring ink from a surface having both ink-receptive and ink-repellent areas. Offset printing incorporates an intermediate transfer of the ink. For example, an offset lithographic press may transfer ink from a plate cylinder to a rubber blanket cylinder, and then the blanket cylinder transfers the image to a surface (e.g., a paper web). In gravure printing, a cylinder with engraved ink wells makes contact with a web of paper and an electric charge may assist in the transfer of the ink onto the paper.

Early implementations of lithographic technology utilized reliefs of the image to be printed on the plate such that ink would only be received by raised areas. Modern lithographic processes take advantage of materials science principles. For example, the image to be printed may be etched onto a hydrophilic plate such that the plate is hydrophobic in the areas to be printed. The plate is wetted before inking such that oil-based ink is only received by the dampening process).

Conventionally, all of these printing techniques have a similar limitation in that the same image is printed over and over again. This is due to the fact that conventional lithographic printing uses plates wherein each plate has a static (i.e., unvarying) image, whether it be a relief image or an etched hydrophobic image, etc. Gravure printing also uses a static image which is engraved in ink wells on a cylinder. There is a substantial overhead cost involved in making the plates that are used by a lithographic press or cylinders/cylinder sleeves used by a gravure press. Therefore, it is not cost effective to print a job on a lithographic or gravure press that will have few copies produced (i.e., a short-run job). Also, conventional lithographic and gravure presses have not been used to print variable data (e.g., billing statements, financial statements, targeted advertisements, etc.) except in cases where such presses have been retrofitted with inkjet heads, albeit at high cost and slower speeds. Typically, short-run jobs and/or jobs that require variability have been typically undertaken by laser (such as electrostatic toner) and/or ink jet printers.

Traditionally, many printed articles such as books and magazines have been printed using a process that involves a great deal of post-press processing. For example, a single page or set of pages of a magazine may be printed 5,000 times. Thereafter, a second page or set of pages may be printed 5,000 times. This process is repeated for each page or set of pages of the magazine until all pages have been printed. Subsequently, the pages or sets of pages are sent to post-processing for assembly and cutting into the final articles. Such traditional workflow is time- and labor-intensive. If variable images (i.e., images that vary from page-to-page or page set-to-page set) could be printed at lithographic image quality and speed, each magazine could be printed in sequential page (or page set) order such that completed magazines would come directly off the press. This would drastically increase the speed and reduce the expenses of printing a magazine.

Ink jet printing technology provides printers with variable capability. There are several ink jet technologies including: thermal, i.e. bubble jet, piezoelectric, so called drop on demand systems, and continuous flow systems. In drop on demand systems, tiny droplets of ink are fired (i.e., sprayed) onto a page. In a thermal jet printer, a heat source vaporizes ink to create a bubble. The expanding bubble causes a droplet to form, and the droplet is ejected from the print head. Piezoelectric technology uses a piezo crystal located at the back of an ink reservoir. Alternating electric potentials are used to cause vibrations in the crystal. The back and forth motion of the crystal is able to draw in enough ink for one droplet and eject that ink onto the paper. Continuous flow systems employ a continuous flow of ink from the jets, the deposition of which is controlled by an electric field that diverts ink ejected from the ink head into a catch basin to prevent printing. Selectively controlling the electric field permits ink to be deposited on the print medium in desired locations.

The quality of high speed color ink jet printing is generally orders of magnitude lower than that of offset lithography and gravure. Furthermore, the speed of the fastest ink jet printer is typically much slower than a lithographic or gravure press. Traditional ink jet printing is also plagued by the effect of placing a water-based ink on paper. Using a water-based ink may saturate the paper and may lead to wrinkling and cockling of the print web, and the web may also be easily damaged by inadvertent exposure to moisture. In order to control these phenomena, ink jet printers use certain specialized papers or coatings. These papers can often be much more expensive than a traditional web paper used for commercial print.

Furthermore, when ink jet technology is used for color printing, ink coverage and water saturation may be increased. This is due to the four color process that is used to generate color images. Four color processing involves laying cyan, magenta, yellow, and black (i.e., CMYK) inks in varying amounts to make a color on the page. Thus, some portions of the page may have as many as four layers of ink if all four colors are necessary to produce the desired color. Additionally, the dots produced by an ink jet printer may spread and produce a fuzzy image. Still further, inks used in ink jet printers are extremely expensive as compared to inks used in traditional lithography or gravure printing. This economic factor alone makes ink jet technology unsatisfactory for the majority of commercial printing applications, particularly long run applications.

Laser printing has limited viability for high speed variable printing at present, because production speeds are still much slower than offset and gravure, and the material costs (e.g., toner, etc.) are extremely high compared to commercial offset or gravure ink prices. Laser color is also difficult to use for magazines and other bound publications, because the printed pages often crack when they are folded.

Printing techniques have been found to be useful in the production of other articles of manufacture, such as electrical components, including transistors and other devices. Still further, indicia or other markings have been printed on substrates other than paper, such as plastic film, metal substrates, and the like. These printing techniques may use those described above to print paper substrates, in which case these techniques suffer from the same disadvantages. In other cases flexography may be used, which, like lithography, requires the prepress preparation of plates.

SUMMARY

In accordance with one aspect, an apparatus for printing includes a substrate having a surface, means for jetting a first gating agent, a layer of first gating agent having a first pattern associated with the substrate, means for applying a principal substance, a layer of principal substance having a second pattern associated with the substrate, and means for transferring the principal substance from the substrate to a print medium in a second pattern. The first pattern and the second pattern are the same when the layer of first gating agent is intermediate the substrate surface and the layer of principal substance, and the first pattern and the second pattern are different when the layer of principal substance is intermediate the substrate surface and the layer of first gating agent. Further, the layer of the first gating agent and the layer of the principal substance are capable of being varied per revolution.

In accordance with another aspect, a method of printing includes the steps of: jetting a layer of first gating agent having a first pattern onto a substrate having a surface; applying a principal substance to the substrate; and transferring the principal substance from the substrate to a print medium in a second pattern. If the first pattern is the same as the second pattern, the layer of first gating agent is intermediate the substrate surface and the layer of principal substance and in this case the gating agent assists the transfer of the principal substance to the print medium. If the first pattern is different from the second pattern, the principal substance is intermediate the substrate surface and the layer of first gating agent and in this case the principal substance is transferred to the print medium where there is no gating agent.

BRIEF DESCRIPTION OF THE DRAWINGS

Further features of the apparatus and methods for controlling application of a principal substance to a substrate, their nature, and various advantages will be more apparent from the following detailed description and the accompanying drawings, in which.

DETAILED DESCRIPTION

One aspect of the present disclosure is to provide a method for high speed variable printing using a gating agent applied transiently to the substrate. This method includes providing a substrate and applying to the substrate a gating agent composition capable of being jetted onto the substrate to enable the formation of images on the substrate. The gating agent composition includes from 0.05 to 3% by weight of a nonionic composition having a hydrophilic-lipophilic balance between about 15 and 30. The gating agent composition also may include up to about 8% by weight of viscosity modifier such that the composition may have a viscosity within the range of about 1 to about 14 centipoise. The balance of the gating agent composition comprises water. The gating agent composition may not contain a discernable amount of dye, pigment or other colorant, and the gating agent may have a surface tension of less than about 40 dynes/cm.

In yet another aspect, an apparatus for controlling application of a substance to a substrate involves the use of a gating agent that blocks the substance from the substrate. The apparatus includes a cartridge and a gating agent contained within the cartridge. The gating agent composition may include a nonionic surfactant, a viscosity control agent, and water.

The apparatus and methods disclosed herein may utilize jetting technology to apply the gating agent directly to the substrate or to an intermediate surface. Any agent may be utilized that blocks the application of ink as desired. Because the embodiments disclosed herein comprehend the use of either (or both) blocking and transfer-aiding compositions, or one or more compositions that have both properties, reference will be made hereinafter to a gating agent that may have either or both of these capabilities with respect to a principal substance. Specifically, the gating agent may block transfer of all, substantially all, or some portions of the principal substance. The gating agent may alternatively, or in addition, aid in transfer of all, substantially all, or a portion of the principal substance, or may block some portion(s) and aid the transfer of other portion(s) of the principal substance.

Figure 1:
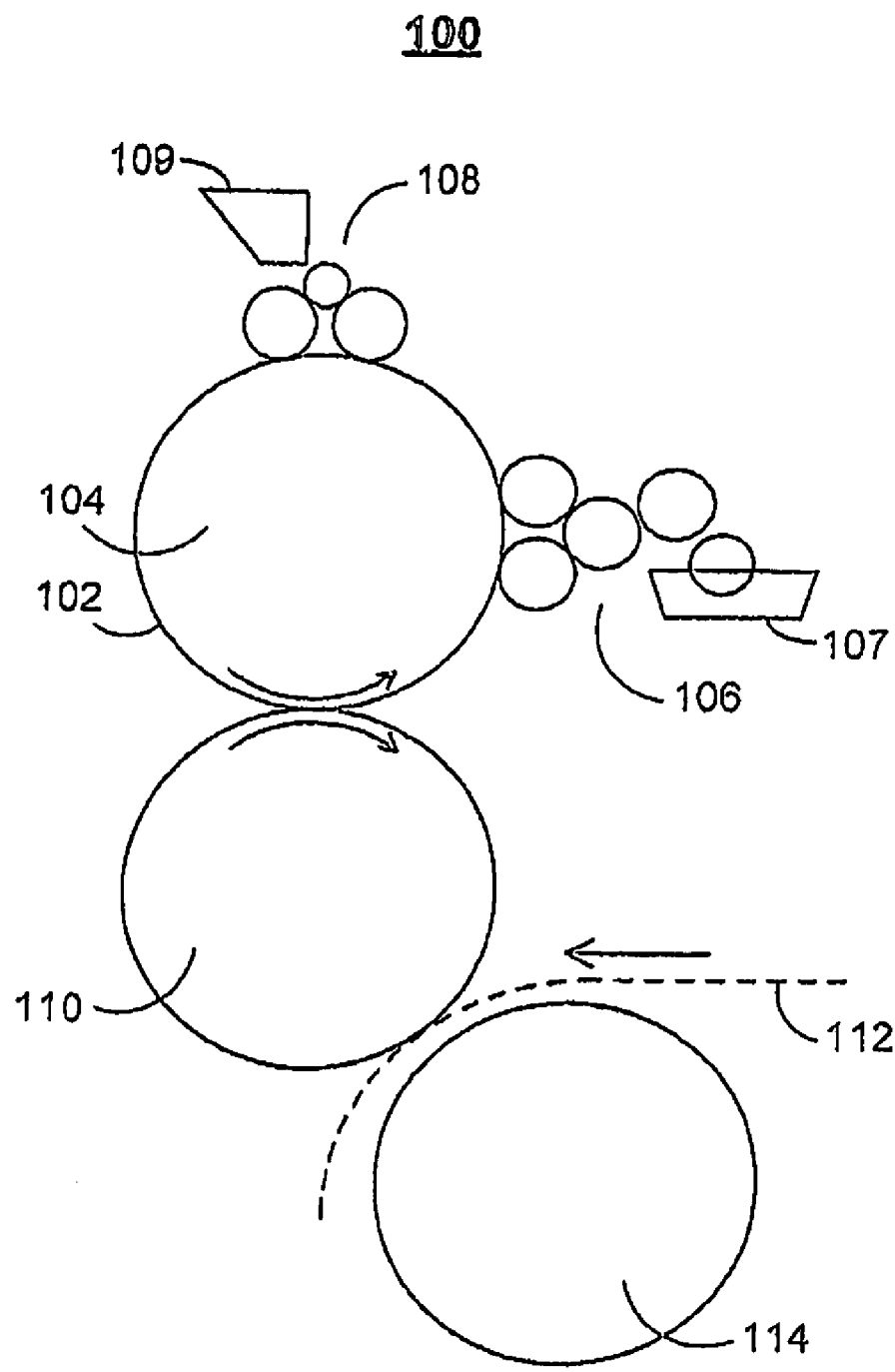
FIG. 1 is a side view of a prior art printing system.

Now turning to the figures, FIG. 1 illustrates traditional offset lithographic printing deck 100. In a traditional lithographic process, the image to be printed is etched onto hydrophilic plate 102 to create hydrophobic regions on the plate which will be receptive to ink. Hydrophilic plate 102 is mounted on plate cylinder 104 and rotated through dampening system 106 and inking system 108. Dampening system 106 may include water supply 107, and inking system 108 may include ink source 109. The hydrophilic portions of plate 102 are wetted by dampening system 106. By using an oil-based ink, ink is only received by the hydrophobic portions of plate 102.

If a blanket cylinder is used, such as blanket cylinder 110, the inked image may be transmitted from plate cylinder 104 to blanket cylinder 110. Then, the image may be further transferred to web 112 (e.g., paper) between blanket cylinder 110 and impression cylinder 114. Using impression cylinder 114, the image transfer to web 112 may be accomplished by applying substantially equal pressure or force between the image to be printed and web 112. When a rubber blanket is used as an intermediary between plate cylinder 104 and web 112, this process is often referred to as "offset printing." Because plate 102 is etched and then mounted on plate cylinder 104, a lithographic press is used to print the same image over and over. Lithographic printing is desirable because of the high quality that it produces. When four printing decks are mounted in series, magazine-quality four color images can be printed.

Figure 2:
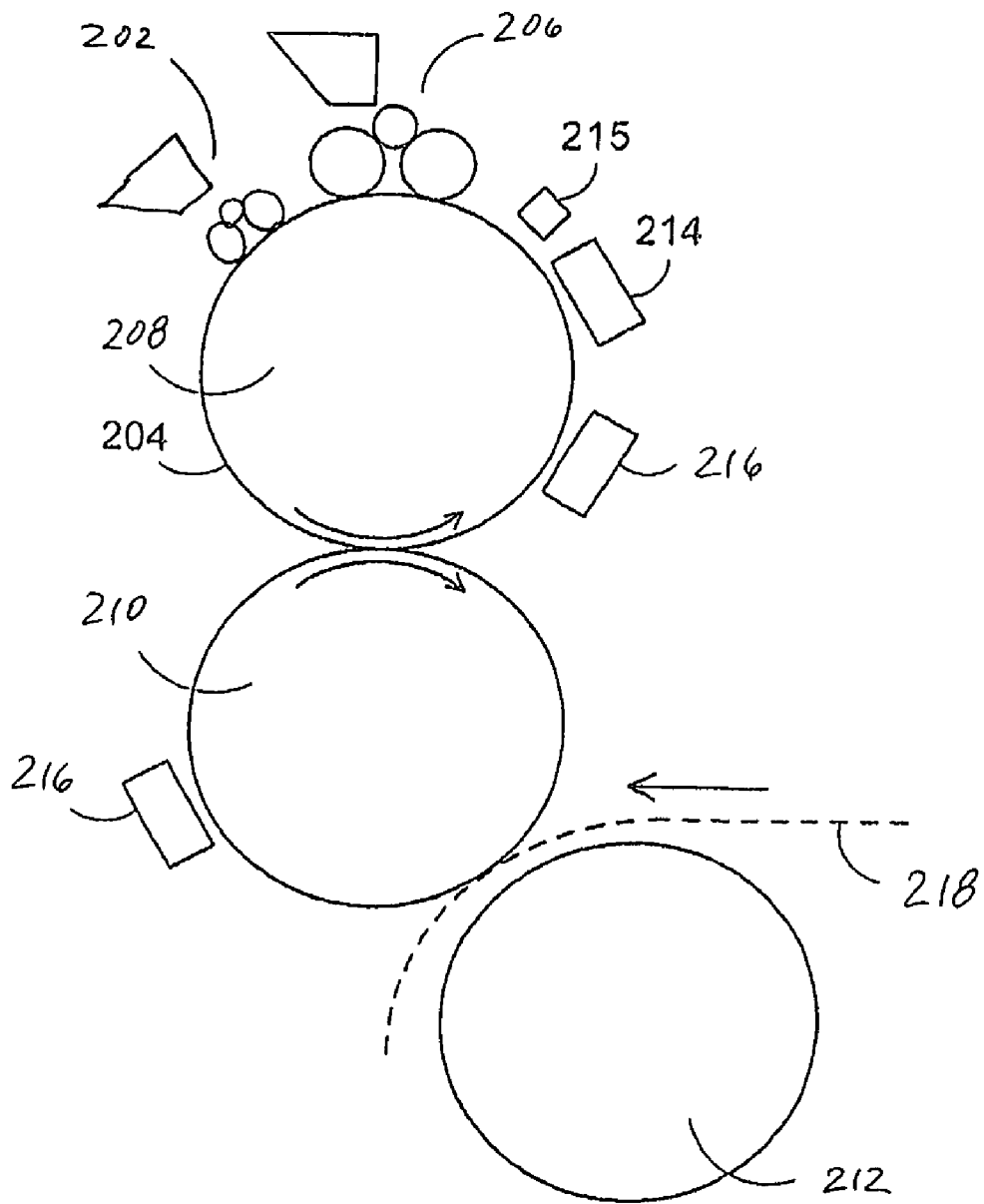
FIG. 2 is a side view of an illustrative embodiment of an apparatus for controlling application of a principal substance to a substrate.

FIG. 2 illustrates a printing deck 200, which may include inking system 202, plate 204, dampening system 206, plate cylinder 208, blanket cylinder 210, and impression cylinder 212 as known in the lithographic printing industry. Plate 204 may be entirely hydrophilic (e.g., a standard anodized aluminum oxide lithographic plate). Here, dampening system 106 of FIG. 1 has been replaced with aqueous jet system 214 and cleaning system 216 in FIG. 2.

Aqueous jet system 214 is placed before the dampening system 206 and may contain a series of ink jet type cartridges (e.g., bubble jet cartridges, thermal cartridges, piezoelectric cartridges, continuous flow cartridges, etc.). The cartridges may contain any number of holes. Commonly, ink jet type cartridges can be found with six hundred pixels per inch, often arranged in two rows of three hundred pixels per inch.

The aqueous jet system 214 may be used to emit an aqueous solution (e.g., water, ethylene glycol, propylene glycol, or any combination thereof). As disclosed herein, the aqueous solution may contain, for example, one or more surfactants, such as Air Products' Surfynol®. Such surfactants may contain a hydrophilic group at one end of each molecule and a lipophilic group at the other end of each molecule. Adding one or more surfactants to the aqueous solution may improve the surface tension properties of the aqueous solution and may serve as an attractant to a lipophilic solution, such as a lithographic ink.

The aqueous jet system 214 may be used to place an aqueous solution on a hydrophilic plate in much the same way that a drop of ink is placed on a piece of paper by an ink jet. In some embodiments, the aqueous solution may be ejected through traditional ink jet type nozzles (i.e., heads). Such ink jet type nozzles may include, for example, ink jet nozzles of known print cartridge units such as those manufactured by HP, Lexmark, Spectra, Canon, etc. In some embodiments, aqueous jet system 214 may support variable print speeds and output resolutions. An example of a jet cartridge and jet head is described in Murakami et al. U.S. Pat. No. 7,240,998, which is incorporated by reference. Continuous systems include systems that are available from Kodak under the trade name Versamark.

The aqueous jet system 214 may be used to "print" or jet the image to be printed, or any portion thereof, on plate cylinder 208. For example, an image controller may receive image data from a data system. The image data may represent the image to be printed or the negative image to be printed. The image data may include variable image data that changes relatively frequently (e.g., every printed page), semi-fixed image data that changes less frequently (e.g., every 100 printed pages), fixed image data that remains static, and any combination of variable, semi-fixed, and fixed image data. Some or all of the image data may be stored as binary data, bitmap data, page description code, or a combination of binary data, bitmap data, and page description code. For example, a page description language (PDL), such as PostScript or Printer Command Language (PCL), may be used to define and interpret image data in some embodiments. A data system may then electronically control aqueous jet system 214 to print in aqueous solution the image (or the negative image) represented by some or all of the different types of image data (or any portion thereof) onto plate cylinder 208.

In some embodiments, as disclosed herein, a vacuum source or heat source 215 may be positioned next to or near aqueous jet system 214. In some embodiments, vacuum source or heat source 215 may be integrated with aqueous jet system 214. The vacuum source or heat source 215 may be used to reduce the size of the individual drops of aqueous solution placed by aqueous jet system 214 by blowing, drying, and/or heating the aqueous solution after it is printed onto plate 204 or plate cylinder 208. Alternatively, any process parameter, including ambient conditions, such as humidity levels, could be manipulated that could affect the drop formation. The ability to control drop size of the aqueous solution may improve the quality of the printed image. The positive image on plate cylinder 208 is presented to fountain solution put down by the damping system 206, and the plate cylinder 208 may be wetted like a standard lithographic plate. The image areas provided by jet system 214 accept ink from the inking system 202.

As plate cylinder 208 completes its revolution, after passing the image to blanket cylinder 210, it passes through cleaning system 216, which may remove ink and/or aqueous solution residue so that plate cylinder 208 may be re-imaged by aqueous jet system 214 during the next revolution (or after a certain number of revolutions). Cleaning system 216 may comprise a rotary brush, a roller having a cleaning solution, a belt, a cleaning web treated with a cleaning solution, an apparatus for delivering heat and/or air, an electrostatic apparatus, or any other suitable means of removing ink, aqueous solution residue, or both, from plate cylinder 208. In some embodiments, blanket cylinder 210 may also have a cleaning system similar to cleaning system 216 to clean any residual material from blanket cylinder 210 after the image has been transferred to web 218. Also because certain embodiments include fluids that are somewhat soluble in the fountain solutions used in lithographic printing, this solubility will assist in cleaning the variable image from plate cylinder 208.

In some embodiments, plate cylinder 208 may have all of the static data for a particular print job etched onto plate 204 by traditional lithographic techniques. The aqueous jet system 214 may then be used to image only variable portions of a job represented by the variable or semi-fixed image data on specified portions of plate 204.

In other embodiments, plate 204 may not be used. Instead, as is understood in the art, the surface of plate cylinder 208 may be treated, processed, or milled to receive the aqueous solution from aqueous jet system 214. Additionally, the plate cylinder 208 may be treated, processed, or milled to contain the static data and be receptive to the aqueous solution to incorporate variable data. In these and any other embodiments herein, blanket cylinder 210 may be eliminated entirely, if desired, by transferring the image directly to web 218.

In some embodiments, one or more of plate 204, plate cylinder 208, and blanket cylinder 210 may be customized or designed to work with various properties of aqueous jet system 214 or the aqueous solution. For example, as is understood in the art, one or more of these plates and cylinders may be specially processed or milled to only accept solution ejected by print heads of a particular resolution or dot size. The plates and cylinders may also be specially processed to accept certain types of aqueous solutions and reject others. For example, the plates and cylinders may accept solutions of a certain volume, specific gravity, viscosity, or any other desired property, while rejecting solutions outside the desired parameters. This may prevent, for example, foreign agent contamination and allow for one aqueous solution to be used in the printing process and another aqueous solution (with different physical properties) to be used in the cleaning process. In other embodiments, customary, general-purpose plates and cylinders are used.

In one embodiment, an aqueous jet system may print or jet an aqueous solution, gating agent, or functional agent with a multifunctional potential onto a pattern substrate. In one embodiment, for example, the gating agent may have a bifunctional potential, though any number of functionalities are contemplated herein. For example, the gating agent may include one or more compounds each having a multifunctional potential or a plurality of compounds each having monofunctional potentials. A functional potential or functionality may include, for example, a functional portion of a compound that may be attributable to a specific chemical moiety and/or structural region of the compound that confers attachment and/or repellant properties to the compound, such as, for example, a hydrophilic region, a lipophilic region, an ionic region, and others known in the art. In one present embodiment, a first functionality may confer attachment capabilities to the pattern substrate, and a second functionality may confer attachment properties to one or more principal substances that may be applied thereto.

In another embodiment, a gating agent may include more than one multifunctional compound where each species of multifunctional compound has at least one functionality in common with the other multifunctional compounds and at least one functionality that differs from the other multifunctional compounds. In this example, a first multifunctional compound and a second multifunctional compound may each be printed onto a similar pattern substrate though the second functionalities of the first multifunctional compound and the second multifunctional compounds may have different specificities for a principal substance that can be attached to either the first or the second multifunctional compound, assuming the principal substance only reacts with one type of functionality. In another embodiment, compounds having monofunctional potentials may interact to form complexes having multifunctionality similar to that of single multifunctional compounds. In this embodiment, the monofunctional compounds may be included in a single composition that is deposited onto a substrate at one time, included in separate compositions deposited simultaneously, or may be contained in separate gating agents that are deposited on a substrate sequentially.

One example of a multifunctional compound contemplated herein includes a compound having one functionality that may be hydrophilic and a second functionality that may be lipophilic. The gating agent may be jetted using in a desired pattern onto a substrate having either hydrophilic or a lipophilic surface, whereby like functionalities amongst the surface and the gating agent would associate to attach the gating agent to the surface and the opposite functionality of the gating agent would be repelled from the surface to render a pattern of the gating agent attached thereon.

A second composition, for example, the principal substance, having a like functionality (for example, hydrophilic or lipophilic) or otherwise attracted selectively to the second functionality of the gating agent, which is not attached to the surface, and that is repulsed from or otherwise not attachable to the exposed surface of the substrate (through, for example, coating with a fountain solution or fluid) may be added to the surface by jetting, dipping, spraying, brushing, rolling, or any other manner known to a skilled artisan. Addition of the principal substance may render a pattern of the principal substance corresponding to that of the gating agent, such that the principal substance is only attached to the surface via the second functionality of the gating agent. It is further contemplated that after the application of the principal substance, one or more additional steps may be performed, including, for example a cleaning step, to ensure regiospecific attachment of the principal substance only to the second functionality of the gating agent and not other areas of the substrate. The principal substance may then be transferred to a second substrate, including, for example, an intermediate roller (e.g., a blanket cylinder) from which an image will be transferred to the print medium, or directly to the print medium to render the desired print image in a highly accurate and clean manner. In this way, selected patterns may be jetted onto a substrate using a gating agent to which a principal substance is subsequently attached that then may be transferred to and immobilized permanently or transiently on a print medium.

Examples of multifunctional compounds contemplated herein include polymers, having at least one hydrophilic portion and at least one lipophilic portion, such as a poloxamer or acetylenediol ethoxylated. The poloxamer suitable for use can be represented by the formula $HO(CH_2CH_2O)_x(CH_2CHCH_3O)_y(CH_2CH_2O)_zH$, wherein x, y, and z represent integers from the range from 2 to 130, especially from 15 to 100, and x and z are identical but chosen independently of y. Among these, there can be used poloxamer 188, wherein x=75, y=30, and z=75, which is obtainable under the trade name Lutrol® F 68 (alternatively Pluronic® F-68) from BASF; poloxamer 185, wherein x=19, y=30, and z=19 (Lubrajel® WA from ISP); poloxamer 235. wherein x=27, y=39. and z=27 (Pluronic® F-85 from BASF); and/or poloxamer 238. wherein x=97, y=39. and z=97 (Pluronic® F-88 from BASF). Another particular surfactant of this type is the block copolymer poly(ethyleneoxide)-poly(propyleneoxide)-poly (ethyleneoxide) known as Pluronic® F-123 from BASF. Other contemplated compounds include ethoxylates, such as polyethylenimine ethoxylate. In addition, a triblock copolymer known commercially as Pluronic® F-127 (poloxamer 407) from BASF for which x=106, y=70, and z=106 may be used. Additionally, poloxamers 101, 108, 124, 181, 182, 184, 217, 231, 234, 237, 282, 288, 331, 333, 334, 335, 338, 401, 402, and 403, respectively, may be included in the gating agent, to name a few. Acetylenediol ethoxylates suitable for use include 3,5-dimethyl-1-hexyn-3-ol (Air Products' Surfynol® 61), and/or 2,4,7,9-tetra-methyl-5-decyne-4,7-diol (Air Products' Surfynol® 104), and Air Products' Surfynol® 400 series surfactants: Surfynol® 420, 440, 465, and 485, respectively. The Surfynol® 400 series surfactants are produced by reacting various amounts of ethylene oxide with 2,4,7,9-tetra-methyl-5-decyne-4,7-diol (Air Products' Surfynol® 104), a nonionic molecule with a hydrophilic section in the middle of two symmetric hydrophobic groups. A further suitable surfactant includes SWLWET™ 7200, a siloxane block polymer, available from OSi Specialties, Inc. (Danbury, Conn., formerly Union Carbide Organo Silicon Products, Systems and Services). Another suitable gating agent component is BASF's Sokalan®, maleic acid/olefin copolymer. Other surfactants may include polyethyleneimine (PEI) having a molecular weight of around 1200, ethoxylated PEI having a molecular weight around 50,000, hexadecyl trimethylammonium bromide (CTAB), polyoxyalkylene ether, poly(oxyethylene)cetyl ether (e.g., Brij® 56 or Brij® 58 from Atlas Chemicals). Other compounds contemplated may contain a hydrophilic group at one end of each molecule and a lipophilic group at the other end of each molecule.

Additional examples of multifunctional compounds contemplated include materials associated with the formation of self-assembled monolayers, such as alkylsiloxanes, fatty acids on oxidic materials, alkanethiolates, alkyl carboxylates, and the like that can be functionalized to accept particulates on one end and attached at an opposite end to a substrate such as a pattern surface. Other similar multifunctional compounds known to one skilled in the art that provide suitable functionalities are contemplated in the present disclosure. Further, gating agents contemplated herein may include, in addition to the one or more multifunctional compounds, for example, water, a water-soluble organic compound, or a combination thereof.

Suitable water-soluble organic components include: alcohols, such as methyl alcohol, ethyl alcohol, n-propyl alcohol, isopropyl alcohol, n-butyl alcohol, sec-butyl alcohol, or tert-butyl alcohol; amides, such as dimethylformamide or dimethylacetamide; carboxylic acids; esters, such as ethyl acetate, ethyl lactate, and ethylene carbonate; ethers, such as tetrahydrofuran or dioxane; glycerin; glycols; glycol esters; glycol ethers; ketones, such as acetone, diacetone, or methyl ethyl ketone; lactams, such as N-isopropyl caprolactam or N-ethyl valerolactam; lactones, such as butyrolactone; organosulfides; sulfones, such as dimethylsulfone; organosulfoxides, such as dimethyl sulfoxide or tetramethylene sulfoxide; and derivatives thereof and mixtures thereof.

Additional contemplated components in the gating agents include a solvent, a preservative, a gating agent anchor, a viscosity modifier, a humectant (e.g. propylene glycol), a biocide, a colorant, a scent, a surfactant, a polymer, a foaming agent, a defoaming agent, a salt, an inorganic compound, an organic compound, water, a pH modifier, and any combination thereof. Some examples of principal substance contemplated herein include lithographic inks, dyes, colorants, and the like.

Viscosity modifying agents may include polyethylene glycol, propylene glycol, cellulosic materials (e.g. CMC), xanthan gum, or Joncryl® 60, Joncryl® 52, Joncryl® 61, Joncryl® 678, Joncryl® 682 solution polymers from BASF, to name a few. The gating agent may also include a thixotropic fluid that changes viscosity under pressure or agitation. Increasing surface tension of the gating agent can also reduce spreading. Surface tension modifiers can include poloxamer (e.g., BASF's Pluronic®) or Air Products' Surfynols®, among others. In addition, other agents may be incorporated in the gating agent composition such as anticurl and anticockle agents, blocking agent anchors, litho ink modifiers, receiving surface modifier, antiseptic agents, biocides, and pH adjusters and maintainers.

Print media contemplated include any substance that is receptive to a principal substance, and include paper, glass, nitrocellulose, textiles, woven materials, metal, plastic, films, gels, and combinations thereof.

In embodiments as disclosed herein, the gating agent may contain from 0.05 to 3% by weight of one or more nonionic surfactants, such as poloxamer, ethoxylated acetylenediol or other ethoxylated surfactants. Such surfactants may contain both a hydrophilic group and a lipophilic group and have a hydrophilic-lipophilic balance between about 15 and 30. Preferably, the nonionic surfactants may include 10 to 80% polyoxyethylene. The balance of the gating agent composition may include water.

The gating agent composition may include a viscosity modifying agent to achieve a viscosity within the range of 1 to 14 centipoises (cP). More preferably, the viscosity is set to 2 to 8 cP, and most preferably to 3 to 5 cP. In some embodiments, the gating agent composition may further include a surface tension modifier to reduce spreading. Preferably, surface tension may be set to less than 40 dynes/cm. More preferably, a surface tension of less than 35 dynes/cm may be attained. The surface tension modifier may include poloxamer (e.g., BASF's Pluronic®) or Air Products' Surfynols®,® (e.g. Surfynol® 400 series surfactants), among others.

In one embodiment, a gating agent may include from about 1% to about 50%, or from about 2% to about 40%, or from about 4% to about 25%, or from about 5% to about 20%, or about 20% polyethylenimine ethoxylate, from about 50% to about 99%, or from about 60% to about 98%, or from about 75% to about 96%, or from about 80% to about 95%, or about 80% water, and optionally polyethylene glycol 400, optionally polyvinyl pyrrilidone, and/or optionally propylene glycol. Further, a gating agent may have a viscosity ranging from about 1 to about 14 centipoises, or from about 2 to about 8 centipoises, or from about 2.5 to about 4 centipoises for liquid systems that may be applied by spraying or jetting. For other variable application technologies, the viscosity can be higher, even up to 1000 centipoises or above.

As evidenced by the above description, surfactant block copolymers having various properties may be used with imaging cylinders having various material properties to achieve an imaging cylinder that has a selectively oleophilic and hydrophilic surface. The physical bond created between the surfactant and the imaging cylinder's surface allows the imaging cylinder to repeat the same image multiple times or to selectively vary the image in any given rotation of the imaging cylinder. By taking advantage of the material properties of the imaging cylinder and the block copolymer surfactants, a durable, yet variable, imaging system having the quality of known lithographic printing techniques may be achieved. Further, without wishing to be bound by theory, it is believed that by using a gating agent contemplated herein to which a principal substance, such as ink, is attached, splitting of the principal substance may be significantly minimized compared to conventional printing systems.

In other embodiments, a litho ink modifier is included in the gating agent formulation. The litho ink modifier alters a property or properties of the underlying blocked ink or other principal substance. The litho ink modifier may include magnesium carbonate, calcium carbonate, mineral oil, liquid asphaltum, powdered asphaltum, burnt plate oils, flash oil, cobalt, soybean oil, and lump rosin, among others.

In yet other embodiments, the gating agent composition includes a receiving surface modifier. The receiving surface (e.g. paper) modifier facilitates the transfer of blocked ink or other principal substance to the receiving surface. The receiving surface modifier may include surface dusting powders such as metal powders, and cork powder, to name a few. Other examples of surface modifying compounds include polyethyleneimine and ethoxylated polyethyleneimine (10 to 80% ethoxylation).

As described above, the gating agent may be applied using one or more jet heads either to a plate or directly to a blanket cylinder, then ink may be applied in a non-selective fashion to the plate or blanket cylinder, and then the ink may be transferred from the image areas on the plate or blanket cylinder to the web of paper. In the event that the gating agent and the ink are applied directly to the blanket cylinder, the plate cylinder need not be used. Particular printing applications that may benefit include static print jobs (particularly, but not limited to, short runs), or variable or customizable print jobs of any size, for example, targeted mailings, customer statements, wallpaper, customized wrapping paper, or the like.

The gating agent may be applied as, for example, an aqueous fluid by being selectively sprayed directly onto the substrate or onto an intermediate surface or directly onto the principal substance using a jet device or other precisely controllable spraying or application technology. An aqueous fluid may generally have a low viscosity and a reduced propensity to form clogs, and is therefore advantageous for use with a jet head. However, the gating agent may also be applied using jet technology in a form other than an aqueous fluid. Examples include UV curable systems and non aqueous siloxane systems Further, the gating agent is not limited to being a fluid at all and may be applied as a solid, for example as a thin film, a paste, a gel, a foam, or a matrix. The gating agent could comprise a powdered solid that is charged or held in place by an opposite electrostatic charge to aid in the application of the principal substance.

As an example, a liquid gating agent in the form of a solvent may be applied by one or more jet heads to a plate and a powdered ink colorant dispersible in the solvent may be deposited over the entire surface of the plate to form a liquid ink in situ in the jetted areas. Powder in the non-jetted areas may be removed (e.g., by inverting the plate so that the powder simply falls off the plate, by air pressure, centrifugal force, etc), thereby resulting in inked and non-inked areas. The solvent may then be jetted onto the areas to be imaged to form liquid ink in such areas, and the electrostatic charge removed so that the powder in the non-wetted areas can be removed. In either event, the resulting image may thereafter be applied to a substrate, for example a web of paper.

Any of the systems described herein may be modified to allow formation of different drop sizes of gating agent. For example, ink jet type heads manufactured by HP may be used to obtain drop sizes on the order of 14 picoliters (pl) up to 1200 dots per inch (dpi) resolution whereas ink jet type heads manufactured by Xaar are capable of ejecting 3 pl drops at 360 dpi but are also able to eject 6 pl, 9 pl, and 12 pl drops. The resolution of the resulting imaged areas can be controlled through appropriate selection of the ink jet type head(s) used to apply the gating agent. The systems described herein may be modified to allow formation of different drop sizes of gating agent. In general, a higher resolution grid, that is a grid with 300 dpi or greater, along with matched drop size improves interaction with blocking or transfer/collection of the principal substance, such as an ink. Also, as the dpi of the grid increases, the size of the drops that is most efficacious generally smaller. A larger drop size is more susceptible to forced wetting of areas to be imaged. This forced wetting can result from merging of adjacent jetted drops when the image is transferred between surfaces (such as in the nip area between a plate and blanket) and can cause a decrease in image quality due to a reduction in print density. Such forced wetting can be minimized by the addition/removal of one or more constituents and/or changing or adjusting one or more physical properties of the gating agent. For example, reducing certain surfactants may reduce ghosting while utilizing, adding, and/or substituting other surfactants may also improve image quality. Alternatively, one could apply an electrostatic charge to a cylinder that is opposite in the polarity to the charge of the gating agent applied to the cylinder. The resulting electrostatic attraction may reduce or eliminate forced wetting.

A still further option is to modulate/control the temperature of one or more process parameters. For example, one might elevate the temperature of the gating agent upon application thereof to a surface to improve adherence and facilitate dispensing thereof. Alternatively, or in addition, the surface may initially be heated during application of gating agent to control adhesion, drop shape/size, and the like, and/or the surface may be chilled (or heated) at some point in the process once the gating agent is applied thereto so that the viscosity of the gating agent is increased, thereby reducing spread of the gating agent into non-wetted areas.

Figure 3:
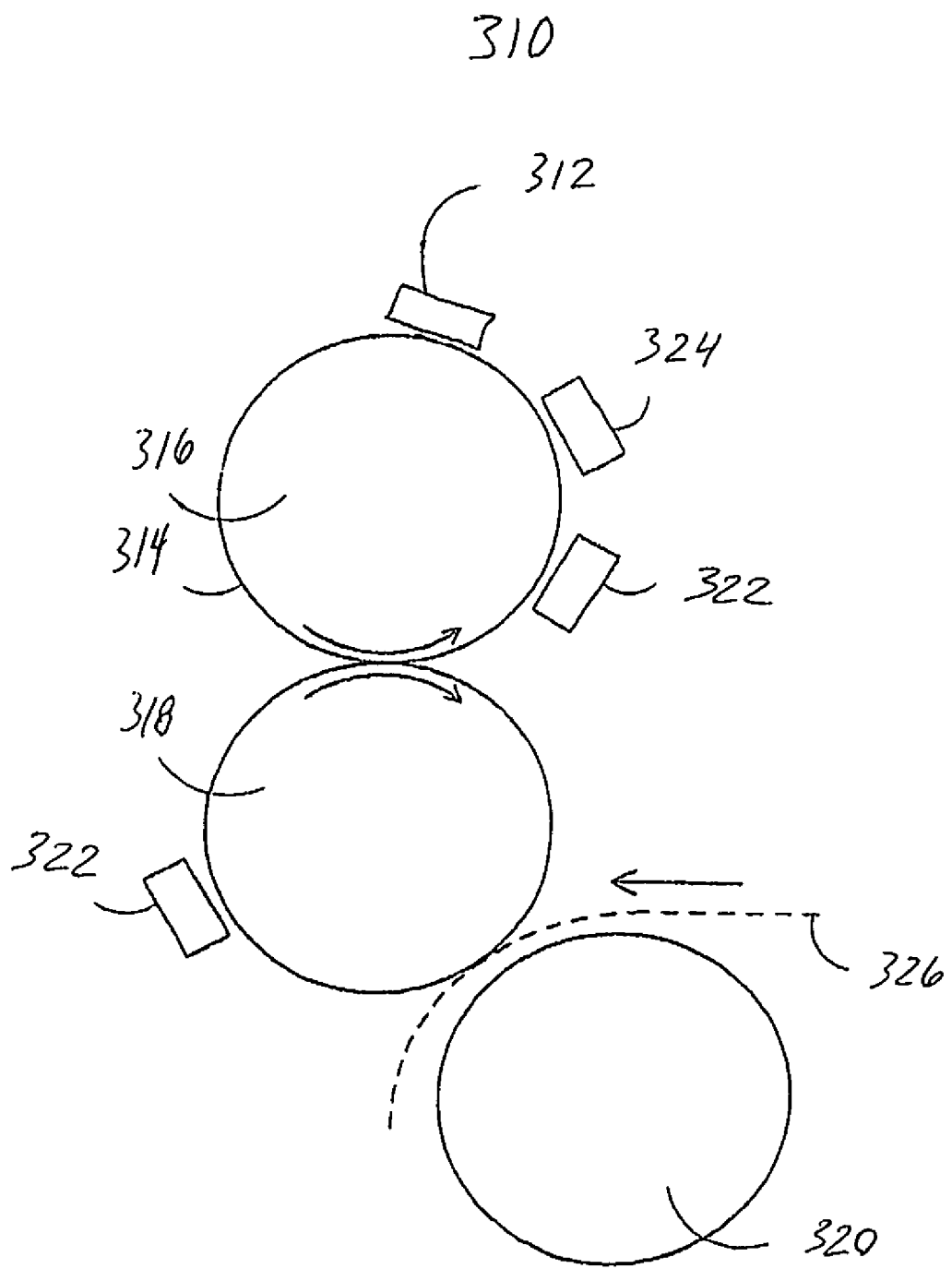
FIG. 3 is a side view of an illustrative embodiment of an apparatus for controlling application of a principal substance to a substrate.

Another example of an apparatus that may be employed to implement the current embodiment is illustrated in FIG. 3. A printing deck 310, may include a principal substance application system 312, a pattern surface 314, a pattern surface cylinder 316, a blanket cylinder 318, and an impression cylinder 320, as known in the lithographic printing industry. The pattern surface 314 may be coated with a polysiloxane or other coating that prevents ink transfer. Further, a cleaning system 322 for removal of excess and/or old gating agent and principal substance or other contaminants is included (shown here on both the pattern surface cylinder 316 and the blanket cylinder 318, though more or fewer are contemplated). An aqueous jet system 324 similar to those described above for application of the gating agent is depicted in relation to the pattern surface cylinder 316, though its placement is variable.

Operation of the printing deck 310 is similar to other embodiments described herein. For example, a gating agent is applied by the aqueous jet system 324 onto the pattern surface 314 of the pattern surface cylinder 316. A principal substance is applied subsequently to the pattern surface 314 via the application system 312. As the pattern surface 314 meets the surface of the blanket cylinder 318, the principal substance is transferred thereto to be further carried thereon until deposited onto a substrate 326. It is further contemplated that the apparatus may exclude blanket cylinder 318 and thus the principal substance would be directly transferred from the pattern surface 314 to the substrate 326. Alternatively, additional rollers as desired may be added that may include, for example, additional aqueous jet systems 324, application systems 312, and cleaning systems 322.

Figure 4:
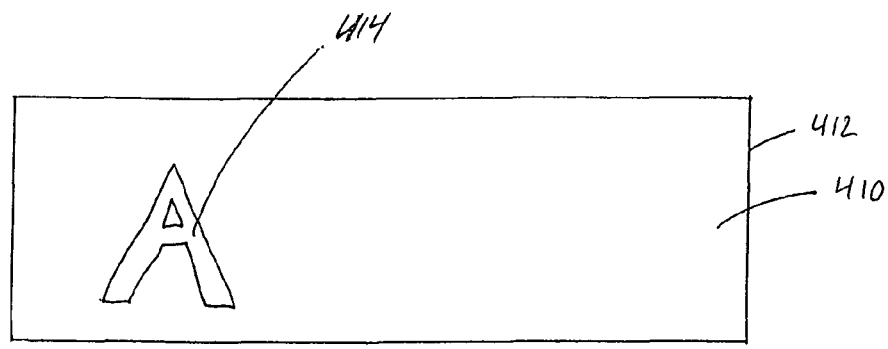
FIG. 4 is a top view of a pattern surface with a character "A" printed thereon using gating agent jetted from one or more ink jet cartridges.
Figure 5:
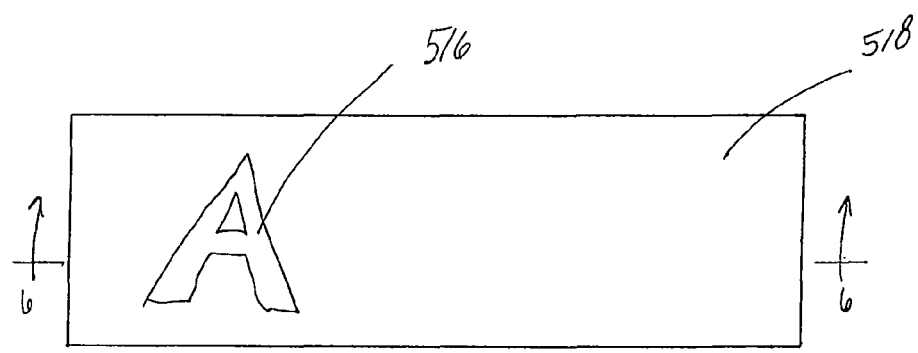
FIG. 5 is a top view of a pattern surface with lithographic ink associated with the gating agent of FIG. 4.
Figure 6:
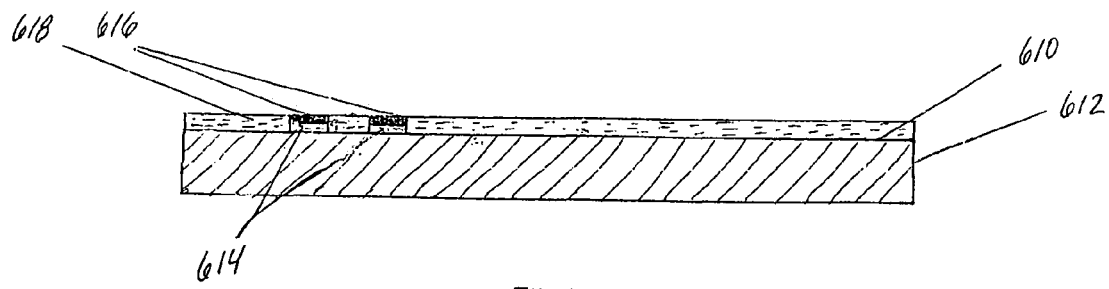
FIG. 6 is a cross-section along lines 6-6 of FIG. 5.

FIG. 4 depicts a hydrophilic pattern surface 410, such as an aluminum surface, of a pattern surface cylinder 412 with a character "A" 414 printed thereon using gating agent jetted from one or more ink jet type heads. The remainder of the pattern surface 410 is free from any added materials and therefore capable attracting and/or attaching other water-based substances. In FIG. 5, the pattern surface (not shown) has been primed with a principal substance, for example, a lipophilic ink 516 and a hydrophilic fountain fluid 518 in preparation for printing. The fountain fluid 518 serves as a blocking agent for the remainder of the pattern surface that has not been printed with the gating agent to prevent the ink from attaching to the pattern surface. Fountain fluids contemplated herein further may help to solubilize the gating agent to enable easy removal thereof after transfer of the principal substance (e.g., ink). The gating agent, however, attracts the ink via lipophilic portions thereof to cover the surface of the character "A" with ink. FIG. 6 depicts a cross-section of the primed pattern surface 610 of the plate cylinder 612. Ink 616 has attached to the gating agent 614, and the fountain fluid 618 has filled the intervening spaces to create a contiguous surface of ink and fountain fluid on the pattern surface. Contact of the primed pattern surface with a print material (not shown) or an intervening roller, belt, or other surface would result in the transfer of the ink with minimal splitting between the pattern surface and the new surface.

In a specific application, the high speed variable printing systems and the gating agent may be used to accomplish blocking or aiding the application of the principal substance by removing or blocking or applying the principal substance in image or non-image areas, removing an aiding agent in non-image areas, preventing the application of the principal substance in certain or all areas, changing the physical or chemical properties of the gating agent or principal substance (such as changing the viscosity or surface tension of the gating agent or principal substance) to affect the application of the gating agent or principal substance, any combination of the foregoing, or by any other suitable method.

In yet other embodiments, the amount of the principal substance applied to the substrate may vary through use of a gating agent in the form of a barrier or a blocking agent with barrier qualities. In such embodiments, the application of the principal substance to the substrate may be blocked either completely or partially, so that the principal substance may be applied in intermediate levels to the substrate, as the barrier or the blocking agent with barrier qualities allows, effectuating a density gradient of the principal substance on the substrate in accordance with desired intermediate levels of principal substance application.

Further embodiments include the gating agent being applied selectively to the principal substance on the surface or other substrate, before or after application of the principal substance to the surface. For example, the gating agent may include a material dispersed within it that is resistant to affinity with the particular embodiment of the principal substance used. The gating agent may then be applied to the surface in non-image areas, with the material dispersed within the gating agent absorbed into and/or received and retained on the surface. The surface may then be passed adjacent a further surface having the principal substance disposed thereon, and the principal substance may be transferred to the first-named surface only in those areas which do not contain the gating agent, as the material dispersed within the gating agent resists the application of the principal substance to the non-image areas.

Properties of the gating agent and of the print medium (e.g., using bond paper, gloss paper, or various coating techniques) may be varied to achieve a desirable interaction between the protective negative image that is printed with the aqueous jet system and the print medium. For example, if image sharpness is desired, it may be beneficial to choose a gating agent that will not be absorbed at all by the print medium. However, if some transfer of ink is desirable even from the areas covered with the output of the aqueous jet system, it may be beneficial to use a print medium that quickly absorbs the aqueous solution so that some ink transfer is also able to occur from the covered areas. Still further, increasing the viscosity of the gating agent and/or increasing the surface tension thereof, and/or using a supporting agent and/or system for non-image and image areas, respectively, such that the boundaries between image and non-image areas are maintained can reduce spreading, thus improving quality. In particular, manipulating the viscosity of the gating agent to 1 to 14 cP prevents flooding, that is forced wetting that loses the image, including ragged edges and lines, as well as minimizes ghosting, Ghosting may occur when ink migrates to a non-image area of a cylinder or when residual ink or gating agent remains on a cylinder from a prior impression. It is important that the viscosity of the gating agent be maintained at a value less than 14 cP to allow for the gating agent to be emitted from the jet head. Other chemical and/or materials science properties might be utilized to reduce or eliminate this effect. The gating agent may also include a thixotropic fluid that changes viscosity under pressure or agitation. Manipulating the surface tension of the gating agent can also reduce spreading.

Still further, surfactant block copolymers having various properties may be used with imaging cylinders having various material properties to achieve an imaging cylinder that has a selectively oleophilic and hydrophilic surface. The physical bond created between the surfactant and the imaging cylinder's surface allows the imaging cylinder to repeat the same image multiple times or to selectively vary the image in any given rotation of the imaging cylinder. By taking advantage of the material properties of the imaging cylinder and the block copolymer surfactants, a durable, yet variable, imaging system having the quality of known lithographic printing techniques may be achieved.

Another process variable is the substrate itself. In the case of a paper substrate, a conventional coated stock of appropriate size, weight, brightness, etc. may be used. One or more coatings, such as clay, may be applied thereto to delay/prevent absorption of principal substance and/or gating agent. In the case of other substrates, such as a printing blanket, a printing plate, a printing cylinder, a circuit board, a plastic sheet, a film, a textile or other sheet, a planar or curved surface of a wall, or other member, etc., the surface to which the principal substance is to be applied may be suitably prepared, processed, treated, machined, textured, or otherwise modified, if necessary or desirable, to aid in and/or block transfer of portions of the principal substance, as desired.

The types and/or physical characteristics and/or chemical compositions of the ink(s) or other principal substance(s) may be selected or modified to obtain desired results. For example, by controlling the surface tension of the ink, color-to-color bleed and show through on the opposite side of the paper can be eliminated. As a further example, one or more ink(s) used in waterless printing applications may be employed together with jetted gating agent (whether the latter is aqueous or non-aqueous) to block or promote transfer of ink from plate to paper. In the case of the use of waterless printing ink(s) with an aqueous gating agent, the composition of the gating agent may be adjusted in view of the lipophilic characteristics of such ink(s) so that the gating agent has a molecular structure that attracts and/or repels the ink(s) as necessary or desirable. Alternatively, jetted gating agent applied initially to a hydrophilic plate may include one or more hydrophilic components that bond with the plate and one or more other components that bond with or repel ink molecules.

As a still further example, a phase change of the gating agent, or the principal substance, or both, may be employed to prevent and/or promote substance blocking or transfer/collection. For example, gating agent may be selectively jetted onto a surface, such as a plate, and principal substance may be applied to the surface having the gating agent applied thereto, whereupon the portions of the principal substance that contact the jetted gating agent may be converted to a gel or a solid. Alternatively, the principal substance may be applied in an indiscriminate (i.e., non-selective) fashion to the plate and the gating agent may thereafter be selectively applied to portions of the plate that are not to be imaged (i.e., non-image areas), whereupon the principal substance in the jetted portions is converted to a gel or solid. Still further, a two (or more) component gating solution could be used wherein the components are individually selectively applied in succession where each is individually jettable, but which, when applied in the same location, react similarly or identically to an epoxy-type and other chemical bonds such as covalent, ionic bonding, etc., and physical interactions such as hydrogen bonding, Van der Waals forces to promote advantageous gating characteristics. The principal substance, such as ink may be applied before or after one or more of the gating agent components are applied. In any of the foregoing examples, a substrate (such as a web of paper) may be imaged by the plate.

Figure 7:
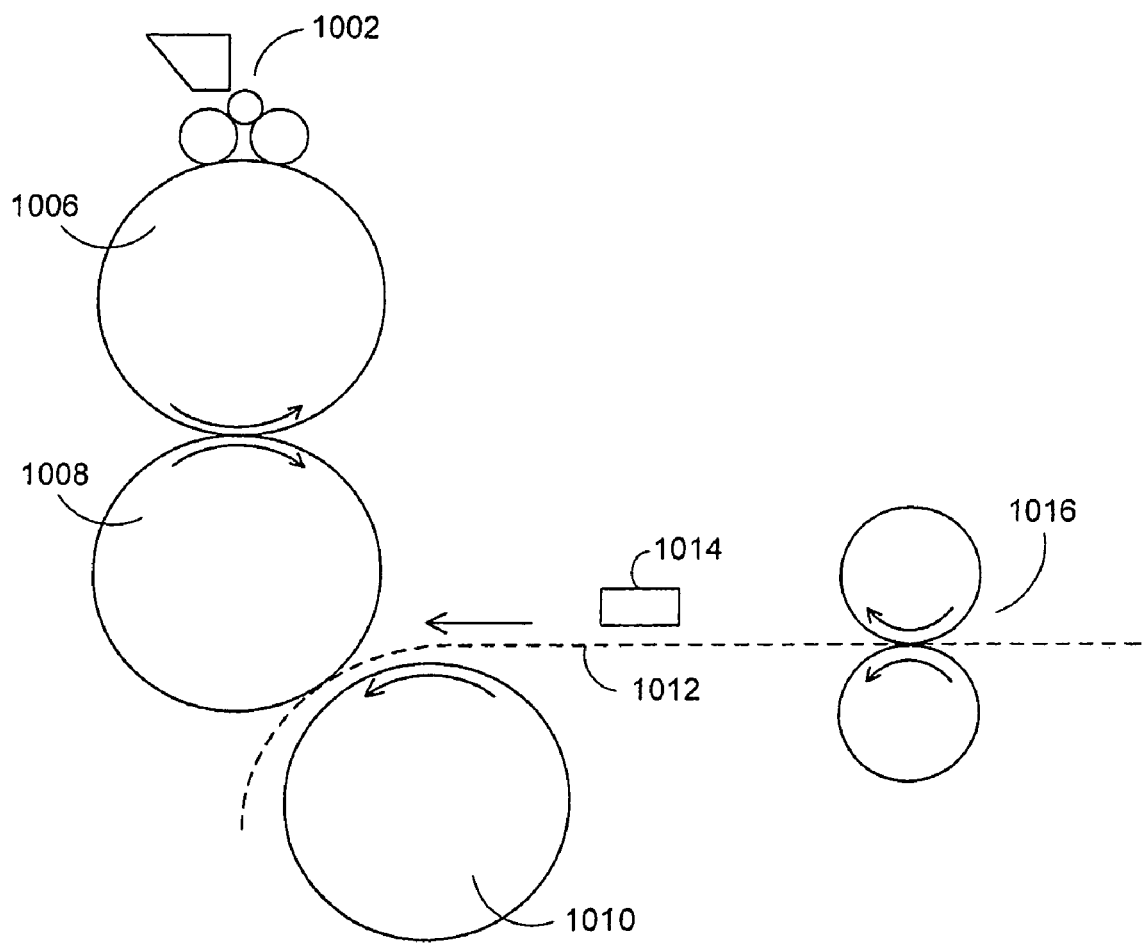
FIG. 7 is a side view of an illustrative embodiment of an apparatus for controlling application of a substance to a substrate.
Figure 8:
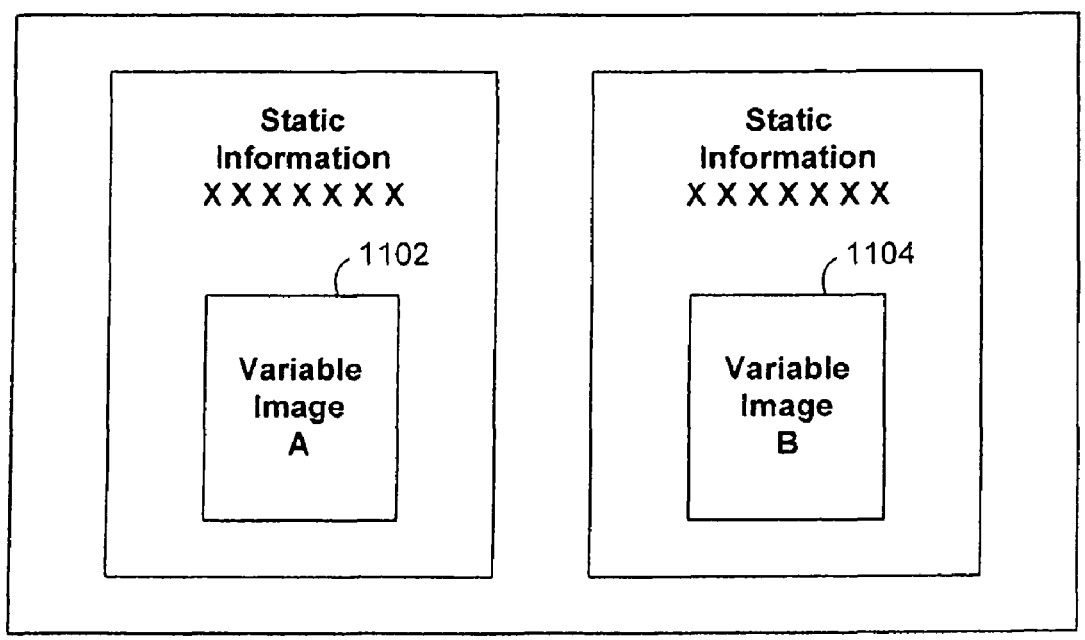
FIG. 8 is an illustration of possible output in accordance with the apparatus shown in FIG. 7.

FIG. 7 illustrates another alternative embodiment. FIG. 7 shows lithographic deck 1000 as known in the art (e.g., inking system 1002, plate cylinder 1006, blanket cylinder 1008, and impression cylinder 1010). However, upstream from lithographic deck 1000, coating system 1016 and aqueous jet system 1014 have been installed. In embodiments like that shown in FIG. 7, a standard lithographic plate may be etched with the static information for a given job or may be completely ink receptive. In one embodiment, a portion of the plate may be reserved for variable information (e.g., plate 1100 may include one or more variable image boxes, such as boxes 1102 and 1104, as shown in FIG. 8). The portion of the lithographic plate that corresponds to the variable image boxes may be formed to be ink receptive over the entire surface of the variable image boxes (i.e., when the variable image box portions of the lithographic plate passes the inking system, the entire rectangular areas will accept ink). In other embodiments, the entire plate may be receptive to ink and the aqueous jet system can provide blocking fluid across the entire web 1012.

To generate the variable image, a negative image of the variable image may be applied in gating agent by aqueous jet system 1014 directly onto web 1012. Before web 1012 reaches aqueous jet system 1014, web 1012 may be, in some embodiments, coated to prevent web 1012 from absorbing the gating agent. In other embodiments, the web 1012 remains uncoated so that the gating agent applied by the aqueous jet system 1014 can apply the image to the entire web 1012. Thus, when the portion of web 1012 to receive the variable image makes contact with the portion of blanket cylinder 1008 transferring the ink for the variable image, web 1012 selectively receives the ink only in the areas not previously printed on by aqueous jet system 1014. The standard lithographic deck operates as though it is printing the same image repeatedly (e.g., a solid rectangle). However, web 1012, which is first negatively imaged by aqueous jet system 1014, only selectively receives the ink in the solid rectangle on blanket cylinder 1008 to create the variable image on web 1012. Coating system 1016 may be an entire deck of its own for applying the coating. Alternatively, coating system 1016 may be any suitable alternative for applying a coating to web 1012 to reduce its ability to absorb the gating agent. For example, coating system 1016 may include a sprayer that sprays a suitable solution onto web 1012. The solution may prevent web 1012 from absorbing all or some of the gating agent.

In any of the foregoing embodiments, a blanket and plate cylinder combination may be replaced by a single imaging cylinder and vice versa. Further, one or more of the aqueous jet systems, cleaning systems, stripping systems, and vacuum or heating systems in embodiments may be electronically controlled via data system.

Still further, the nip pressure of the roller(s) and the compressibility characteristic of the roller(s) at which the principal substance is applied to the substrate may be varied to control image quality as well as the compressibility characteristic of the nip roller. Also, rolls or cylinders having a textured surface may be used to control the application of the principal substance to the substrate, as desired. Still further, or in addition, the volume of the drops of gating fluid could be adjusted to control the amount of ink transferred into each cell, thereby affecting grayscale.

A still further option is to modulate/control the temperature of one or more process parameters. For example, one might elevate the temperature of the gating agent upon application thereof to a surface to improve adherence and facilitate dispensing thereof. Alternatively, or in addition, the surface may initially be heated during application of gating agent to control adhesion, drop shape/size, and the like, and/or the surface may be chilled at some point in the process once the gating agent is applied thereto so that the viscosity of the gating agent is increased, thereby reducing spread of the gating agent into non-wetted areas.

One could further use multiple different liquids dispensed by separate jet devices that, when applied together, create a gating agent that has improved adherence and/or viscosity and/or other desirable characteristic. The liquids may be applied at the different or same temperatures, pressures, flow rates, etc.

Yet another embodiment comprehends the use of two or more arrays or ink jet heads for selectively applying gating agent alone, or for selectively applying gating solution to one or more areas of a surface and, optionally, ink to one or more remaining areas of the surface, wherein one or more of the arrays can be independently removed and switched over while the press is running, or, reconfigured (in terms of position) for the next succeeding job (e.g., where regional customization is required).

Due to variations in ink tack from print unit to print unit, one may undertake a successive modification of gating agent characteristics from unit to unit to effectively optimize ink transfer by each unit. Yet another modification involves the use of a phase change material to build up a printing surface.

In yet other embodiments, the gating agent(s) used to control application of the principal substance to the substrate may be combinations of blocking and aiding agents. In one example, the principal substance is disposed on a surface and is covered in non-image areas by a blocking agent that blocks application of the principal substance to the substrate. In image areas, the principal substance is covered by an aiding agent that tends to establish a bond with the principal substance to aid in application onto the substrate. Alternately, the gating agent(s) may be disposed on the surface and covered by the principal substance. In one example, a lipophilic blocking agent is selectively disposed on non-image areas of the surface and a hydrophilic aiding agent is selectively disposed on image areas of the surface. The principal substance is then disposed on top of the layer created by both gating agents. The layer of both gating agents having a consistent height on the first surface may prevent migration between the principal substance and the aiding agent. As the surface is moved adjacent the substrate, the blocking agent keeps the principal substance from being applied to the substrate, while the aiding agent allows application of the principal substance to the substrate.

In alternate embodiments, the surface may be a lithographic plate, cylinder, or the like having a portion that may be used for controlling application of the principal substance to the substrate by applying variable configurations of the principal substance to the substrate. In such embodiments, variable symbology, encoding, addressing, numbering, or any other variable tagging technique may be utilized in the portion of the first surface reserved for controlling application of the principal substance. The principal substance is first disposed on the first surface indiscriminately. Before the substrate is passed near the first surface for application of the principal substance, a blocking agent is selectively applied to the substrate in an area where the reserved portion of the first surface will subsequently be moved adjacent the substrate so as to allow the desired configuration, or image, of the principal substance to be applied thereto. In a more general embodiment, the substrate may be brought adjacent one or more than one surface having similar or differing principal substances disposed thereon, wherein blocking and/or aiding agents are selectively transferred to the substrate from the surfaces in the reserved portion. In one embodiment, a magnetic ink is transferred from one of these surfaces to the substrate (e.g., a paper web). One or more non-magnetic inks may be transferred from the same surface or from one or more additional surfaces. A gating agent may be used to either block or aid application of the magnetic ink to the paper web in a desired configuration in the reserved portion thereof using any of the techniques for using blocking and aiding agents described above. The result is a printed paper web having markings of magnetic ink (such as a MICR marking or other encoded information) that may be changed from impression-to-impression. One example is applying encoded RFID circuits as part of the variable print process. This eliminates the need for post printing programming.

According to a still further embodiment, the gating agent is selectively applied to a receiver surface by one or more jet heads and attracts or blocks an intermediate fluid, such as traditional fountain solution, which is applied indiscriminately to the receiver surface but gated by the gating agent, such that the fountain solution adheres selectively to the receiver surface prior to application of ink thereto. In this embodiment, the gating solution is formulated to interact with and control the fountain solution, as opposed to controlling the ink. Additional embodiments may neutralize or compromise the fountain solution, or selectively enable removal thereof from the receiver surface. In more general terms, these embodiments comprehend the use of a selectively applied gating solution together with indiscriminately applied fountain solution and ink wherein the gating agent controls where the fountain solution is maintained.

As mentioned above, the gating agent may include one or more surfactants or may be temperature or vacuum controlled to produce drop size and viscosity characteristics that are favorable to produce a high quality image. However, the quality of an image may also be affected by a phenomenon known to those of skill in the art as ghosting, which may be an especially serious problem if consecutive images are different.

Ghosting may be diminished by assuring that the image and non-image areas are clean of ink and/or any gating agents between successive impressions. Cleaning the cylinder after every application of ink therefrom as described with respect to any of the cleaning systems discussed hereinabove is one way to assure that the cylinder is clean. The composition of the gating agent may also be engineered to reduce ghosting by promoting more complete cleaning by the cleaning system.

Another approach to diminish ghosting is to inhibit the migration of ink from the image areas to the non-image areas on the cylinder. A lipophilic solution may be precisely applied to the image areas to attract ink thereto and inhibit migration therefrom. Independently, or in combination with the lipophilic solution, a lipophobic solution may be precisely applied to the non-image areas of the cylinder to inhibit migration of ink thereto.

One of the advantages of using the concepts for processing variables and static print jobs as described herein is the inherent speed associated with a conventional lithographic press. In fact, press speed compared to a conventional lithographic press is limited by the speed at which an image area can be created, which in turn depends upon the method of creation of the image area. Such methods have been described herein to include application of a gating agent to create the image area. The gating agent may be a lipophilic or hydrophilic solution, or some other solution that may have an electrostatic charge applied thereto. The gating agent may also be an electrostatic charge applied to a portion of a cylinder. The maximum speed at which any of these gating agents is applied to one or more cylinders of the press may limit the speed of operation of the press.

For most operating conditions wherein an ink jet cartridge is utilized in normal ink jet printing, the ejection of a droplet from the cartridge is considered to be an instantaneous event that produces a spot of ink of predetermined size on a target substrate. In reality, the ejection of a droplet from an ink jet cartridge is not an instantaneous event, but is in fact a transient event, having a beginning, a middle, and an end. If a target substrate is moving at a high speed, the ink droplet may strike the substrate to form a spot of ink having a tail trailing the spot in a direction opposite to the direction of travel of the substrate. This phenomenon, known as tailing, is a direct result of the transient nature of the droplet generation. Tailing at high press speeds may limit the effective speed of the press due to print quality concerns. It has been found, however, that certain gating agents, when used with particular jet cartridges may inhibit or alleviate the tailing of the ejected droplets, thereby removing this effect as a limiting factor on maximum press speed.

The apparatus and methods disclosed herein are also relevant in other industries and other technologies, for example, textiles, pharmaceuticals, biomedical, and electronics, among others. Variably customizable graphics or text, or a principal substance having enhanced sealing properties or water or fire resistance may be selectively applied to webs of textiles such as may be used to manufacture clothing or rugs. In the pharmaceutical industry, the principal substance may be a drug, a therapeutic, diagnostic, or marking substance other than an ink, or a carrier for any other type of substance. In biomedical applications, for example, the principal substance may be a biological material or a biocompatible polymer. In electronics applications, the principal substance may be an electrically conductive or insulative material that may be selectively applied in one or more layers on the substrate. Other electronic applications include production of radio frequency identification ("RFID") tags on articles. Other industries may also benefit from selective application of a principal substance to a substrate. For example, the principal substance may be a thermally conductive or insulative material selectively applied over components of an item of manufacture, for example, a heat exchanger, a cooking pan, or an insulated coffee mug. The principal substance may also be a material with enhanced absorptive, reflective, or radiative properties, some or all of which may be useful in other items of manufacture, for example, when the principal substance is selectively applied to components of an oven, a lamp, or sunglasses. Still further uses for the principal substance may include customizable packaging films or holograms (via selective filling of refractive wells prior to image forming). Moreover, the technology could be applied to fuel cell manufacturing and the principal substance may include functional polymers, adhesives and 3-D interconnect structures. In applications for the manufacture of micro-optical elements, the principal substance could be an optical adhesive or a UV-curing polymer. Yet a further application may be display manufacturing wherein the principal substance is a polymer light-emitting diode material.

Further, in a specific application, the apparatus and high speed variable printing methods disclosed herein may be used in a number of lithographic applications. For example, the disclosed apparatus and methods may be ideal for high-quality one-to-one marketing applications, such as direct mailing, advertisements, statements, and bills. Other applications are also well-suited to the systems and methods disclosed herein, including the production of personalized books, periodicals, publications, posters, and displays. The high speed variable printing systems and methods disclosed herein may also facilitate post-processing (e.g., binding and finishing) of any of the aforementioned products.

The following examples further illustrate the disclosure but, of course, should not be construed as in any way limiting its scope.

Example 1

A gating agent formulation useful in the present disclosure was prepared as follows:

8 wt % Sokalan® maleic acid/olefin copolymer (95% actives)

1 wt % SILWET™ 7200 siloxane block polymer 91 wt % water

Example 2

A second gating agent formulation useful in the present disclosure was prepared as follows:
30 wt % PEG 200
1 wt % Surfynol® 400 series
1 wt % Pluronic®
68 wt % water

Example 3

A third gating agent formulation useful in the present disclosure was prepared as follows:
15 wt % Joncryl® 50
10 wt % isopropyl alcohol
1 wt % SWLWET™ 7200 siloxane block polymer
30 wt % PEG 200
44 wt % water All of the formulations of Examples 1-3 were useful as gating agents and produced valuable print with a minimum of ghosting, tailing, flooding, or background color.

It will be understood that the foregoing is only illustrative of the principles of the systems and methods disclosed herein, and that various modifications can be made by those skilled in the art without departing from the scope and spirit of such systems and methods. For example, the order of some steps in the procedures that have been described is not critical and can be changed if desired. Also, various steps may be performed by various techniques.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus for printing, comprising:
a substrate having a surface;
means for jetting a first gating agent;
a layer of first gating agent having a first pattern associated with the substrate;
means for applying a principal substance;
a layer of principal substance having a second pattern associated with the substrate; and
means for transferring the principal substance from the substrate to a print medium in the second pattern,
wherein the first pattern and the second pattern are the same when the layer of first gating agent is intermediate the substrate surface and the layer of principal substance, and the first pattern and the second pattern are different when the layer of principal substance is intermediate the substrate surface and the layer of first gating agent, and
wherein the layer of the first gating agent and the layer of the principal substance are capable of being varied per revolution.

2. The apparatus of claim 1, wherein the first pattern and the second pattern are complementary when the layer of principal substance is intermediate the substrate surface and the layer of first gating agent.

3. The apparatus of claim 1, wherein the substrate comprises at least one of a printing blanket, a printing plate, a printing cylinder, a sheet, a planar surface of a wall, a curved surface of a wall, an etched surface, a milled surface, a treated surface, a hydrophobic surface, or a hydrophilic surface.

4. The apparatus of claim 1, wherein the means for jetting comprises at least one of an aqueous jet system, a continuous flow ink jet system, a thermal jet system, or a piezoelectric jet system.

5. The apparatus of claim 1, wherein the means for jetting comprises one or more jet cartridges comprising one or more nozzles.

6. The apparatus of claim 5, wherein the one or more jet cartridges comprise the first gating agent.

7. The apparatus of claim 1, wherein the print medium comprises at least one of paper, glass, nitrocellulose, a woven material, a metal, a plastic, a film, a gel, a plate, a circuit board, a sheet, or a textile.

8. The apparatus of claim 1, wherein the principal substance comprises at least one of a carrier, a lithographic ink, a dye, a protein, a nucleic acid, a small molecule, a biological sample, a pharmaceutical, a cell, a biocompatible polymer, a therapeutic substance, a diagnostic substance, a non-ink marking substance, an electrically conductive material, an insulative material, a thermally conductive material, a radio frequency identification tag, a hydrophilic portion, a lipophilic portion, a silicon oxide, a metal, a functional polymer, an adhesive, a magnetic ink, a 3-D interconnect structure, an optical adhesive, a UV-curing polymer, a polymer light-emitting diode material, water, or a water-soluble organic compound.

9. The apparatus of claim 1, wherein if the first pattern is the same as the second pattern, the principal substance is attached to the substrate via the jetted layer of first gating agent.

10. The apparatus of claim 1, wherein if the first pattern is different than the second pattern, the jetted layer of first gating agent is attached to the substrate via the principal substance.

11. The apparatus of claim 1, wherein means for transferring the principal substance comprises at least one of an intervening roller, a belt, or a blanket cylinder.

12. The apparatus of claim 1, further comprising at least one of a cleaning system or a sterilizing system.

13. The apparatus of claim 12, wherein the cleaning system comprises at least one of a rotary brush, a roller, a cleaning solution, a belt, a cleaning web, an apparatus for delivering heat, an apparatus for delivering air, or an electrostatic apparatus.

14. The apparatus of claim 1, wherein the first gating agent comprises at least one of a compound having a multifunctional potential, a compound having a hydrophilic region, a compound having a lipophilic region, a compound having an ionic region, a compound having a receptor/recognition region, a compound having a paratope, a compound having a specific chemical moiety that confers attachment properties, a compound having a specific chemical moiety that confers repellant properties, a compound having a specific structural region that confers attachment properties, a compound having a specific structural region that confers repellant properties, a poloxamer, a surfactant, a solvent, a preservative, an anticurl agent, an anticockle agent, a gating agent anchor, a humectant, an antiseptic agent, a biocide, a colorant, a scent, a polymer, a defoaming agent, a salt, an inorganic compound, an organic compound, water, a pH adjuster, a pH maintainer, a receiving surface modifier, a litho ink modifier, a surface tension modifier, a viscosity modifying agent, a maleic acid/olefin copolymer, a polyethyleneimine, a polyoxyethylene, a water-soluble organic compound, or a thixotropic fluid.

15. A method of printing, comprising the steps of:
jetting in a first pattern a first gating agent onto a substrate having a surface;
applying a principal substance to the substrate; and
transferring the principal substance from the substrate to a print medium in a second pattern;
wherein if the first pattern is the same as the second pattern, the jetted layer of the first gating agent is intermediate the substrate surface and the principal substance and in this case the gating agent assists the transfer of the principal substance to the print medium, and if the first pattern is different from the second pattern, the principal substance is intermediate the substrate surface and the jetted layer of the first gating agent and in this case the principal substance is transferred to the print medium where there is no gating agent.

16. The method of claim 15, further comprising at least one of a cleaning step or a sterilization step.

17. The method of claim 15, further comprising jetting a second gating agent.

18. The method of claim 15, wherein the substrate comprises at least one of a printing blanket, a printing plate, a printing cylinder, a sheet, a planar surface of a wall, a curved surface of a wall, an etched surface, a milled surface, a treated surface, a hydrophobic surface, or a hydrophilic surface.

19. The method of claim 15, wherein the print medium comprises at least one of paper, glass, nitrocellulose, a woven material, a metal, a plastic, a film, a gel, a plate, a circuit board, a sheet, or a textile.

20. The method of claim 15, wherein the principal substance comprises at least one of a carrier, a lithographic ink, a dye, a protein, a nucleic acid, a small molecule, a biological sample, a pharmaceutical, a cell, a biocompatible polymer, a therapeutic substance, a diagnostic substance, a non-ink marking substance, an electrically conductive material, an insulative material, a thermally conductive material, a radio frequency identification tag, a hydrophilic portion, a lipophilic portion, a silicon oxide, a metal, a functional polymer, an adhesive, a magnetic ink, a 3-D interconnect structure, an optical adhesive, a UV-curing polymer, a polymer light-emitting diode material, water, or a water-soluble organic compound.

21. The method of claim 15, wherein if the first pattern is the same as the second pattern, the principal substance is attached to the substrate via the jetted layer of first gating agent.

22. The method of claim 15, wherein if the first pattern is different than the second pattern, the jetted layer of first gating agent is attached to the substrate via the principal substance.

23. The method of claim 15, wherein means for transferring the principal substance comprises at least one of an intervening roller, a belt, or a blanket cylinder.

24. The method of claim 15, further comprising at least one of a cleaning step or a sterilizing step.

25. The method of claim 17, wherein the first gating agent and the second gating agent each independently comprises at least one of a compound having a multifunctional potential, a compound having a hydrophilic region, a compound having a lipophilic region, a compound having an ionic region, a compound having a receptor/recognition region, a compound having a paratope, a compound having a specific chemical moiety that confers attachment properties, a compound having a specific chemical moiety that confers repellant properties, a compound having a specific structural region that confers attachment properties, a compound having a specific structural region that confers repellant properties, a poloxamer, a surfactant, a solvent, a preservative, an anticurl agent, an anticockle agent, a gating agent anchor, a humectant, an antiseptic agent, a biocide, a colorant, a scent, a polymer, a defoaming agent, a salt, an inorganic compound, an organic compound, water, a pH adjuster, a pH maintainer, a receiving surface modifier, a litho ink modifier, a surface tension modifier, a viscosity modifying agent, a maleic acid/olefin copolymer, a polyethyleneimine, a polyoxyethylene, a water-soluble organic compound, or a thixotropic fluid.

* * * * *